US009066306B2

(12) United States Patent
Yavuz et al.

(10) Patent No.: US 9,066,306 B2
(45) Date of Patent: Jun. 23, 2015

(54) INTERFERENCE MANAGEMENT UTILIZING POWER CONTROL

(75) Inventors: Mehmet Yavuz, San Diego, CA (US); Peter J. Black, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1154 days.

(21) Appl. No.: 12/212,465

(22) Filed: Sep. 17, 2008

(65) Prior Publication Data

US 2009/0082026 A1    Mar. 26, 2009

Related U.S. Application Data

(60) Provisional application No. 60/974,428, filed on Sep. 21, 2007, provisional application No. 60/974,449, filed on Sep. 21, 2007, provisional application No. 60/974,794, filed on Sep. 24, 2007, provisional application No. 60/977,294, filed on Oct. 3, 2007.

(51) Int. Cl.
| | |
|---|---|
| *H04Q 7/20* | (2006.01) |
| *H04W 52/36* | (2009.01) |
| *H04B 17/318* | (2015.01) |
| *H04W 52/24* | (2009.01) |

(52) U.S. Cl.
CPC .......... *H04W 52/367* (2013.01); *H04W 52/248* (2013.01); *H04W 52/243* (2013.01); *H04B 17/318* (2015.01)

(58) Field of Classification Search
CPC . H04W 52/16; H04W 52/248; H04W 52/367; H04W 52/325

USPC ........ 455/522, 69, 67.11, 500, 517, 423–425, 455/426.1, 426.2, 550.1, 509, 511, 513, 455/515; 370/329, 328, 343, 338, 310
See application file for complete search history.

(56) References Cited

U.S. PATENT DOCUMENTS

| | | | |
|---|---|---|---|
| 5,329,530 | A | 7/1994 | Kojima |
| 5,528,597 | A | 6/1996 | Gerszberg et al. |
| 5,579,373 | A | 11/1996 | Jang |
| 5,582,597 | A | 12/1996 | Brimhall et al. |
| 5,594,720 | A | 1/1997 | Papadopoulos et al. |
| 5,758,271 | A | 5/1998 | Rich et al. |

(Continued)

FOREIGN PATENT DOCUMENTS

| | | |
|---|---|---|
| CA | 2538576 A1 | 9/2006 |
| CN | 1140938 A | 1/1997 |

(Continued)

OTHER PUBLICATIONS

European Search Report—EP10168170,Search Authority—Munich Patent Office, Oct. 19, 2010.
International Search Report and Written Opinion—PCT/US08/077114, International Searching Authority—European Patent Office, Jan. 13, 2010.
Partial International Search Report—PCT/US2008/077130, International Search Authority—European Patent Office—Jan. 19, 2009.

(Continued)

*Primary Examiner* — Keith Ferguson

(57) ABSTRACT

Interference that occurs during wireless communication may be managed through the use of fractional reuse and other techniques. In some aspects fractional reuse may relate to HARQ interlaces, portions of a timeslot, frequency spectrum, and spreading codes. Interference may be managed through the use of a transmit power profile and/or an attenuation profile. Interference also may be managed through the use of power management-related techniques.

59 Claims, 25 Drawing Sheets

(56) References Cited

U.S. PATENT DOCUMENTS

| | | |
|---|---|---|
| 5,787,346 A | 7/1998 | Iseyama |
| 5,852,630 A | 12/1998 | Langberg et al. |
| 5,892,796 A | 4/1999 | Rypinski |
| 6,005,856 A | 12/1999 | Jensen et al. |
| 6,038,223 A | 3/2000 | Hansson et al. |
| 6,061,549 A | 5/2000 | Labonte et al. |
| 6,301,242 B1 | 10/2001 | Lindsay et al. |
| 6,496,706 B1 | 12/2002 | Jou et al. |
| 6,535,739 B1 | 3/2003 | Chen et al. |
| 6,577,671 B1 | 6/2003 | Vimpari |
| 6,594,238 B1 | 7/2003 | Wallentin et al. |
| 6,597,668 B1 | 7/2003 | Schafer et al. |
| 6,597,705 B1 | 7/2003 | Rezaiifar et al. |
| 6,680,902 B1 | 1/2004 | Hudson |
| 6,690,657 B1 | 2/2004 | Lau et al. |
| 6,765,898 B1 | 7/2004 | Bloch |
| 6,768,444 B2 | 7/2004 | Langsford |
| 6,879,829 B2 | 4/2005 | Dutta et al. |
| 7,003,310 B1 | 2/2006 | Youssefmir et al. |
| 7,016,319 B2 | 3/2006 | Baum et al. |
| 7,099,298 B2 | 8/2006 | Kim |
| 7,106,707 B1 | 9/2006 | Strutt |
| 7,139,284 B1 | 11/2006 | Furukawa et al. |
| 7,155,655 B2 | 12/2006 | Cheng |
| 7,162,204 B2 | 1/2007 | Hansen et al. |
| 7,185,257 B2 | 2/2007 | Kim et al. |
| 7,239,622 B2 | 7/2007 | Black |
| 7,260,761 B2 | 8/2007 | Dottling et al. |
| 7,266,393 B2 | 9/2007 | Latva-Aho et al. |
| 7,302,276 B2 | 11/2007 | Bernhardsson et al. |
| 7,373,128 B2 | 5/2008 | Dowling |
| 7,379,958 B2 * | 5/2008 | Karhu ............................ 709/201 |
| 7,401,236 B2 | 7/2008 | Adachi |
| 7,430,431 B2 | 9/2008 | Harris et al. |
| 7,468,966 B2 | 12/2008 | Baker et al. |
| 7,489,720 B2 | 2/2009 | Hinton et al. |
| 7,492,751 B2 | 2/2009 | Kim |
| 7,515,563 B2 | 4/2009 | Ponnekanti |
| 7,519,324 B2 | 4/2009 | Jacomb-Hood et al. |
| 7,525,909 B2 | 4/2009 | Fan et al. |
| 7,539,165 B2 | 5/2009 | Toskala et al. |
| 7,539,501 B2 | 5/2009 | Moorti et al. |
| 7,555,300 B2 | 6/2009 | Scheinert et al. |
| 7,564,827 B2 | 7/2009 | Das et al. |
| 7,574,179 B2 | 8/2009 | Barak et al. |
| 7,620,370 B2 | 11/2009 | Barak et al. |
| 7,627,293 B2 | 12/2009 | Bhandari et al. |
| 7,680,026 B2 | 3/2010 | Stopler |
| 7,693,125 B2 | 4/2010 | Ihm et al. |
| 7,756,519 B2 | 7/2010 | Barak et al. |
| 7,764,661 B2 | 7/2010 | Heo et al. |
| 7,839,939 B2 | 11/2010 | Lee et al. |
| 7,864,744 B2 | 1/2011 | Song et al. |
| 7,864,877 B2 | 1/2011 | Hottinen |
| 7,907,571 B2 | 3/2011 | Raghothaman et al. |
| 7,920,544 B2 | 4/2011 | Soliman et al. |
| 7,974,230 B1 | 7/2011 | Talley et al. |
| 8,060,104 B2 | 11/2011 | Chaudhri et al. |
| 8,139,518 B2 | 3/2012 | Blessent et al. |
| 8,254,279 B2 | 8/2012 | Wheatley et al. |
| 8,483,620 B2 | 7/2013 | Horn et al. |
| 8,700,083 B2 | 4/2014 | Yavuz et al. |
| 8,712,461 B2 | 4/2014 | Yavuz et al. |
| 8,848,619 B2 | 9/2014 | Nanda et al. |
| 2001/0049295 A1 | 12/2001 | Matsuoka et al. |
| 2002/0051433 A1 | 5/2002 | Affes et al. |
| 2002/0136179 A1 | 9/2002 | Aoyama et al. |
| 2002/0154621 A1 | 10/2002 | Laroia et al. |
| 2002/0167907 A1 | 11/2002 | Sarkar et al. |
| 2002/0168993 A1 | 11/2002 | Choi et al. |
| 2003/0086364 A1 | 5/2003 | Horne |
| 2003/0109274 A1 | 6/2003 | Budka et al. |
| 2003/0128679 A1 | 7/2003 | Ishiguro et al. |
| 2003/0206576 A1 | 11/2003 | Seo |
| 2004/0092281 A1 | 5/2004 | Burchfiel |
| 2004/0114552 A1 | 6/2004 | Lim et al. |
| 2004/0141568 A1 | 7/2004 | Huat |
| 2004/0147287 A1 | 7/2004 | Nelson, Jr. et al. |
| 2004/0151264 A1 | 8/2004 | Montojo et al. |
| 2004/0160925 A1 | 8/2004 | Heo et al. |
| 2004/0179480 A1 | 9/2004 | Attar et al. |
| 2005/0003827 A1 | 1/2005 | Whelan |
| 2005/0070287 A1 | 3/2005 | Cave et al. |
| 2005/0201351 A1 | 9/2005 | Nakao |
| 2005/0286547 A1 | 12/2005 | Baum et al. |
| 2006/0018279 A1 | 1/2006 | Agrawal et al. |
| 2006/0019679 A1 | 1/2006 | Rappaport et al. |
| 2006/0039273 A1 | 2/2006 | Gore et al. |
| 2006/0094436 A1 | 5/2006 | Kim et al. |
| 2006/0104242 A1 | 5/2006 | Kim et al. |
| 2006/0104254 A1 | 5/2006 | Shin et al. |
| 2006/0111137 A1 | 5/2006 | Mori et al. |
| 2006/0116154 A1 * | 6/2006 | Han ............................ 455/522 |
| 2006/0120471 A1 | 6/2006 | Learned et al. |
| 2006/0262754 A1 | 11/2006 | Andersson et al. |
| 2007/0004423 A1 | 1/2007 | Gerlach et al. |
| 2007/0010203 A1 | 1/2007 | Wee et al. |
| 2007/0047552 A1 | 3/2007 | Astely |
| 2007/0087749 A1 | 4/2007 | Ionescu et al. |
| 2007/0153749 A1 | 7/2007 | Waxman |
| 2007/0173199 A1 | 7/2007 | Sinha |
| 2007/0191051 A1 | 8/2007 | Suonvieri |
| 2007/0259682 A1 | 11/2007 | Kaikkonen et al. |
| 2007/0270155 A1 | 11/2007 | Nelson et al. |
| 2007/0275729 A1 | 11/2007 | Kashima et al. |
| 2008/0008147 A1 | 1/2008 | Nakayama |
| 2008/0031144 A1 | 2/2008 | Kawamoto et al. |
| 2008/0039129 A1 | 2/2008 | Li et al. |
| 2008/0062925 A1 * | 3/2008 | Mate et al. .................... 370/331 |
| 2008/0069186 A1 | 3/2008 | Rice |
| 2008/0076407 A1 | 3/2008 | Shitara |
| 2008/0080364 A1 | 4/2008 | Barak et al. |
| 2008/0089296 A1 | 4/2008 | Kazmi et al. |
| 2008/0101212 A1 | 5/2008 | Yu et al. |
| 2008/0144493 A1 | 6/2008 | Yeh |
| 2008/0222021 A1 | 9/2008 | Stanforth et al. |
| 2008/0225966 A1 | 9/2008 | Tseng et al. |
| 2008/0242243 A1 | 10/2008 | Kikuchi |
| 2008/0280575 A1 | 11/2008 | Pesola |
| 2008/0297415 A1 | 12/2008 | Berens et al. |
| 2008/0298488 A1 | 12/2008 | Shen et al. |
| 2008/0316957 A1 | 12/2008 | Shen et al. |
| 2009/0003305 A1 | 1/2009 | Gerstenberger et al. |
| 2009/0011765 A1 | 1/2009 | Inoue et al. |
| 2009/0017832 A1 | 1/2009 | Tebbs et al. |
| 2009/0042593 A1 | 2/2009 | Yavuz et al. |
| 2009/0042596 A1 | 2/2009 | Yavuz et al. |
| 2009/0046632 A1 | 2/2009 | Nanda et al. |
| 2009/0047931 A1 | 2/2009 | Nanda et al. |
| 2009/0052395 A1 | 2/2009 | Bao et al. |
| 2009/0059907 A1 | 3/2009 | Sindhwani et al. |
| 2009/0069017 A1 | 3/2009 | Usuda et al. |
| 2009/0080386 A1 | 3/2009 | Yavuz et al. |
| 2009/0080499 A1 | 3/2009 | Yavuz et al. |
| 2009/0081970 A1 | 3/2009 | Yavuz et al. |
| 2009/0082027 A1 | 3/2009 | Yavuz et al. |
| 2009/0086861 A1 | 4/2009 | Yavuz et al. |
| 2009/0092111 A1 | 4/2009 | Horn et al. |
| 2009/0111473 A1 | 4/2009 | Tao et al. |
| 2009/0116393 A1 | 5/2009 | Hughes et al. |
| 2009/0135754 A1 | 5/2009 | Yavuz et al. |
| 2009/0135790 A1 | 5/2009 | Yavuz et al. |
| 2009/0135796 A1 | 5/2009 | Nanda et al. |
| 2009/0137221 A1 | 5/2009 | Nanda et al. |
| 2009/0137241 A1 | 5/2009 | Yavuz et al. |
| 2009/0203320 A1 | 8/2009 | Horn et al. |
| 2009/0203372 A1 | 8/2009 | Horn et al. |
| 2009/0252099 A1 | 10/2009 | Black et al. |
| 2009/0291690 A1 | 11/2009 | Guvenc et al. |
| 2010/0086092 A1 | 4/2010 | Wiatrowski et al. |
| 2010/0118996 A1 | 5/2010 | Sundaresan et al. |
| 2010/0128630 A1 | 5/2010 | Barak et al. |
| 2010/0136989 A1 | 6/2010 | Westerberg et al. |
| 2010/0136998 A1 | 6/2010 | Lott et al. |

(56) References Cited

U.S. PATENT DOCUMENTS

| | | |
|---|---|---|
| 2010/0178921 A1 | 7/2010 | Aqvist et al. |
| 2010/0184423 A1 | 7/2010 | Kent et al. |
| 2011/0009065 A1 | 1/2011 | Carter |
| 2011/0090827 A1 | 4/2011 | Kattwinkel |
| 2011/0096708 A1 | 4/2011 | Novak et al. |
| 2011/0255520 A1 | 10/2011 | Chu et al. |
| 2012/0258746 A1 | 10/2012 | Tokgoz et al. |
| 2014/0233416 A1 | 8/2014 | Black et al. |
| 2014/0376520 A1 | 12/2014 | Yavuz et al. |

FOREIGN PATENT DOCUMENTS

| | | |
|---|---|---|
| CN | 1257385 A | 6/2000 |
| CN | 1281326 A | 1/2001 |
| CN | 1308824 A | 8/2001 |
| CN | 1360804 A | 7/2002 |
| CN | 1463511 A | 12/2003 |
| CN | 1613224 A | 5/2005 |
| CN | 1728582 A | 2/2006 |
| CN | 1762117 A | 4/2006 |
| CN | 1853315 A | 10/2006 |
| CN | 1871573 A | 11/2006 |
| CN | 1989775 A | 6/2007 |
| CN | 101036314 A | 9/2007 |
| CN | 101043406 A | 9/2007 |
| CN | 101378534 A | 3/2009 |
| CN | 100566291 C | 12/2009 |
| CN | 101754314 A | 6/2010 |
| EP | 0720405 | 7/1996 |
| EP | 1035742 A1 | 9/2000 |
| EP | 1318613 A2 | 6/2003 |
| EP | 1503534 A1 | 2/2005 |
| EP | 1533910 | 5/2005 |
| EP | 1564912 | 8/2005 |
| EP | 1566917 A2 | 8/2005 |
| EP | 1710920 A1 | 10/2006 |
| EP | 1798884 A1 | 6/2007 |
| EP | 1838118 A1 | 9/2007 |
| GB | 2349045 | 10/2000 |
| GB | 2367455 A | 4/2002 |
| GB | 2402023 | 11/2004 |
| IL | 197172 A | 1/2013 |
| JP | 5122146 A | 5/1993 |
| JP | 9163431 A | 6/1997 |
| JP | 9200846 A | 7/1997 |
| JP | 9238378 A | 9/1997 |
| JP | H09261730 A | 10/1997 |
| JP | 2000287250 A | 10/2000 |
| JP | 2000316183 A | 11/2000 |
| JP | 2001127679 A | 5/2001 |
| JP | 2001251233 | 9/2001 |
| JP | 2002050988 A | 2/2002 |
| JP | 2002077043 A | 3/2002 |
| JP | 2002094483 A | 3/2002 |
| JP | 2002218528 A | 8/2002 |
| JP | 2003018074 A | 1/2003 |
| JP | 2003051775 A | 2/2003 |
| JP | 2003174400 A | 6/2003 |
| JP | 2003179450 A | 6/2003 |
| JP | 2004260489 A | 9/2004 |
| JP | 2005210703 A | 8/2005 |
| JP | 2005278163 A | 10/2005 |
| JP | 2005341415 A | 12/2005 |
| JP | 2006135673 A | 5/2006 |
| JP | 2006197639 A | 7/2006 |
| JP | 2007074047 A | 3/2007 |
| JP | 2007116730 A | 5/2007 |
| JP | 2007129497 A | 5/2007 |
| JP | 2007514367 A | 5/2007 |
| JP | 2007527649 A | 9/2007 |
| JP | 2007529915 A | 10/2007 |
| JP | 2007306407 A | 11/2007 |
| JP | 2008546235 A | 12/2008 |
| JP | 2009506655 | 2/2009 |
| JP | 2009514397 | 4/2009 |
| JP | 4740241 B2 | 8/2011 |
| KR | 20050055736 A | 6/2005 |
| KR | 20060129219 A | 12/2006 |
| KR | 20070064287 A | 6/2007 |
| KR | 20100044895 A | 4/2010 |
| RU | 2107994 C1 | 3/1998 |
| RU | 2111619 | 5/1998 |
| RU | 2198467 C2 | 2/2003 |
| RU | 2208880 C2 | 7/2003 |
| RU | 2210864 | 8/2003 |
| RU | 2210867 | 8/2003 |
| RU | 2212093 | 9/2003 |
| RU | 2002129901 A | 3/2004 |
| RU | 2242091 C2 | 12/2004 |
| RU | 2005111551 A | 9/2005 |
| RU | 2276458 C2 | 5/2006 |
| RU | 2278480 C2 | 6/2006 |
| RU | 2005138862 | 6/2006 |
| RU | 2300175 | 5/2007 |
| RU | 2305363 | 8/2007 |
| TW | 486894 B | 5/2002 |
| TW | 200421894 | 10/2004 |
| WO | WO9210890 | 6/1992 |
| WO | WO9512296 A1 | 5/1995 |
| WO | WO9619048 A2 | 6/1998 |
| WO | 9908464 | 2/1999 |
| WO | WO9933215 A1 | 7/1999 |
| WO | WO9949595 A1 | 9/1999 |
| WO | 9960809 | 11/1999 |
| WO | WO0007377 A2 | 2/2000 |
| WO | WO0008751 | 2/2000 |
| WO | WO0062435 A1 | 10/2000 |
| WO | WO0126269 A1 | 4/2001 |
| WO | 0178440 A1 | 10/2001 |
| WO | WO-03001834 A1 | 1/2003 |
| WO | WO03013190 A2 | 2/2003 |
| WO | WO2005011145 | 2/2003 |
| WO | WO03032564 | 4/2003 |
| WO | WO-2004028186 A2 | 4/2004 |
| WO | 2004086636 A2 | 10/2004 |
| WO | WO-04114715 A2 | 12/2004 |
| WO | WO2004105294 | 12/2004 |
| WO | WO2004114552 A1 | 12/2004 |
| WO | 2005027265 A1 | 3/2005 |
| WO | WO2005041515 | 5/2005 |
| WO | WO-2005057975 A1 | 6/2005 |
| WO | WO2005062798 A2 | 7/2005 |
| WO | 2006007318 | 1/2006 |
| WO | WO-2006026715 A1 | 3/2006 |
| WO | WO2006038694 A1 | 4/2006 |
| WO | WO-2006051867 A1 | 5/2006 |
| WO | WO2006099547 A1 | 9/2006 |
| WO | 2006127617 | 11/2006 |
| WO | WO-2006122805 A1 | 11/2006 |
| WO | WO2007007662 A1 | 1/2007 |
| WO | 2007024932 | 3/2007 |
| WO | WO2007024895 A2 | 3/2007 |
| WO | WO2007024932 A1 | 3/2007 |
| WO | WO2007050921 | 5/2007 |
| WO | WO2007051148 | 5/2007 |
| WO | 2007077522 | 7/2007 |
| WO | 2007095860 | 8/2007 |
| WO | WO-2007090053 A1 | 8/2007 |
| WO | WO2007100032 A1 | 9/2007 |
| WO | WO2007124111 A2 | 11/2007 |
| WO | 2008024340 A2 | 2/2008 |
| WO | WO2008030934 A2 | 3/2008 |
| WO | WO-2008134337 | 11/2008 |
| WO | WO2009039426 | 3/2009 |
| WO | WO2010006909 A1 | 1/2010 |

OTHER PUBLICATIONS

International Search Report—PCT/US2008/077098, International Search Authority—European Patent Office—Mar. 20, 2009.
Written Opinion—PCT/US2008/077098, International Search Authority—European Patent Office—Mar. 20, 2009.
International Search Report—PCT/US2008/077104, International Search Authority—European Patent Office—Feb. 16, 2009.

(56) References Cited

OTHER PUBLICATIONS

Written Opinion—PCT/US2008/077104, International Search Authority—European Patent Office—Feb. 16, 2009.
Akin David: "Spectral Masks and Interference" CWNP Wireless Certification & Wireless Training, [Online] Sep. 20, 2007, XP002514078. Retreived From the Internet: URL:http://www.cwnp.com/community/articles/spectral_masks_and_inteference.html> [retrieved on Feb. 2005.
International Search Report—PCT/US2008/077124, International Search Authority—European Patent Office—Feb. 18, 2009.
Written OpinionPCT/US2008/077124, International Search Authority—European Patent Office—Feb. 18, 2009.
Taiwan Search Report—TW097136204—TIPO—Feb. 21, 2012.
Jouko Vankka et al., "FIR Filters for Compensating D/A Converter Frequency Response Distribution", IEEE, 2002.
3GPP2: Medium Access Control Lyaer for Ultra Mobile Broadband (UMB) Air Interface Specification, ver. 1.0, Apr. 2007 also at http://www.3gpp2.org/Public_html/specs/C.S0084-002-0_v1.0_070423.pdf. pp. 3 & 34-39.
Fan et al., "Interference Management in Femto Cell Deployment", 3GPP2, S00-FEMTO-20071015-025_QCOM Femto Interference Management, Oct. 15, 2007.
Goldsmith, a.J. et at. "Adaptive Coded Modulation for Fading Channels," IEEE Transactions on Communications, vol. 46, No. 5 (May 1998), pp. 595-602.
Gruenheid R., et al., "Adaptive Modulation and Multiple Access for the OFDM Transmission Technique" May 1, 2000, Wireless Personal Communications, Springer, Dordrecht, NL, pp. 5-13, XP000894156 ISSN; 0929-6212 abstract p. 9, paragraph 5.2—p. 10.
Kim et al., "Femto Air Interface Deployment Modeling, Simulation, and Performance", 3GPP2, S00-FEMT0-20071015 021_Airvana_AirInterface_Modeling_Simulation_Performance_R3, Oct. 15, 2007.
Philips, "Text proposal for gating during compressed mode", TSGR1#19(01)0280, 3GPP, Mar. 2, 2001.
Sean Ginevan: "Femtoceils: Is There Room for Them on Your Network" Internet Article July 27, 2007, XP002510044 Retrieved from the Internet: URL:http://www.networkcomputing.com/article/printFullArticle.jhtml;jsessionid=GBC4GHJLLIWZCQSNDLPSKHSCJUNN2JVN"articleID=201201521>[retrieved on Jan. 13, 2009] Heading: "Show me the ROI",; p. 2.
Tokgoz, Y., et al., "Uplink Interference Management for HSPA+ and 1xEVDO Femtocells", Global Telecommunications Conference (GLOBECOM), 2009, IEEE, Piscataway, NJ, USA, Nov. 30, 2009, pp. 1-7, XP031845438, ISBN: 978-1-4244-4148-8.
Wong et al., "Training sequence optimization in MIMO systems with colored interference," IEEE Trans. Commun., vol. 52, pp. 1939-1947, Nov. 2004.
Wikipedia: "Puncturing", the free encyclopedia, URL: http://en.wikipedia.org/wiki/Puncturing. Retrieved on Apr. 23, 2014, p. 1.
U.S. Appl. No. 14/307,416, filed Jun. 17, 2014 by Mehmet Yavuz.
Hansen C.J., "Thoughts on TX Spectral Masks for 802.11n," IEEE 802.11-04/0060r0, 2004, pp. 1-14.
3rd Generation Partnership Project; Technical Specification Group Radio Access Networks; FDD Home NodeB RF Requirements Work Item Technical Report (Release 8), 3GPP Standard; 3GPP TR 25.967, 3rd Generation Partnership Project (3GPP), Mobile Competence Centre; 650, Route Des Lucioles; F-06921 Sophia-Antipolis Cedex; France, No. 2.0.0, Feb. 1, 2009, pp. 1-58, XP05038087.
China Unicom et al., "Joint Proposal for 3GPP2 Physical Layer for FDD Spectra", C30-20060731-040R4_HKLLMNQRSUZ_PP2Phase2_FDD_Proposal -1,3GPP2,2006.07.31.
Huawei, "Cell re-selection for hNB," 3GPP TSG RAN2 #59 Tdoc R2-073159, 3GPP, Aug. 24, 2007, URL: http://www.3gpp.org/ftp/tsg_ran/WG2_RL2/TSGR2_59/Docs/R2-073159.zip.

* cited by examiner

INTERFERENCE MANAGEMENT UTILIZING POWER CONTROL

CLAIM OF PRIORITY UNDER 35 U.S.C. §119

This application claims the benefit of and priority to commonly owned U.S. Provisional Patent Application No. 60/974,428, filed Sep. 21, 2007, U.S. Provisional Patent Application No. 60/974,449, filed Sep. 21, 2007, U.S. Provisional Patent Application No. 60/974,794, filed Sep. 24, 2007, and U.S. Provisional Patent Application No. 60/977,294, filed Oct. 3, 2007, the disclosure of each of which is hereby incorporated by reference herein.

CROSS-REFERENCE TO RELATED APPLICATION

This application is related to concurrently filed and commonly owned U.S. patent application Ser. No. 12/212,622, entitled "INTERFERENCE MANAGEMENT UTILIZING HARQ INTERLACES," U.S. patent application Ser. No. 12/212,638, entitled "INTERFERENCE MANAGEMENT EMPLOYING FRACTIONAL TIME REUSE," U.S. patent application Ser. No. 12/212,612, entitled "INTERFERENCE MANAGEMENT UTILIZING POWER AND ATTENUATION PROFILES," U.S. patent application Ser. No. 12/212,513, entitled "INTERFERENCE MANAGEMENT EMPLOYING FRACTIONAL FREQUENCY REUSE," and U.S. patent application Ser. No. 12/212,570, entitled "INTERFERENCE MANAGEMENT EMPLOYING FRACTIONAL CODE REUSE," the disclosure of each of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem.

Since radio frequency ("RF") coverage of small-coverage base stations may not be optimized by the mobile operator and deployment of such base stations may be ad-hoc, RF interference issues may arise. Moreover, soft handover may not be supported for small-coverage base stations. Thus, there is a need for improved interference management for wireless networks.

SUMMARY

A summary of sample aspects of the disclosure follows. It should be understood that any reference to the term aspects herein may refer to one or more aspects of the disclosure.

The disclosure relates in some aspect to managing interference through the use of fractional reuse techniques. For example, in some aspects fractional reuse may involve using a portion of a set of allocated hybrid automatic repeat-request ("HARQ") interlaces for uplink traffic or downlink traffic. In some aspects fractional reuse may involve using a portion of a timeslot allocated for uplink traffic or downlink traffic. In some aspects fractional reuse may involve using a portion of a frequency spectrum allocated for uplink traffic or downlink traffic. In some aspects fractional reuse may involve using a portion of a set of spreading codes (e.g., SF16) allocated for uplink traffic or downlink traffic. In some aspects, such portions may be defined and assigned such that neighboring nodes use non-overlapping resources. In some aspects, the definition and assignment of such portions may be based on interference related feedback.

The disclosure relates in some aspects to managing interference through the use of power management-related techniques. For example, in some aspects transmit power of an access terminal may be controlled to mitigate interference at a non-associated access point. In some aspects a noise figure or receive attenuation of an access point is controlled based on the received signal strength associated with signals from one or more access terminals.

The disclosure relates in some aspects to managing interference through the use of a transmit power profile and/or an attenuation profile. For example, downlink transmit power or uplink receiver continuation may be varied dynamically at a node as a function of time. Here, different nodes may use different phases of the profile to mitigate interference between the nodes. In some aspects the profile may be defined based on interference-related feedback.

BRIEF DESCRIPTION OF THE DRAWINGS

These and other sample aspects of the disclosure will be described in the detailed description and the appended claims that follow, and in the accompanying drawings, wherein:

Figure 1:
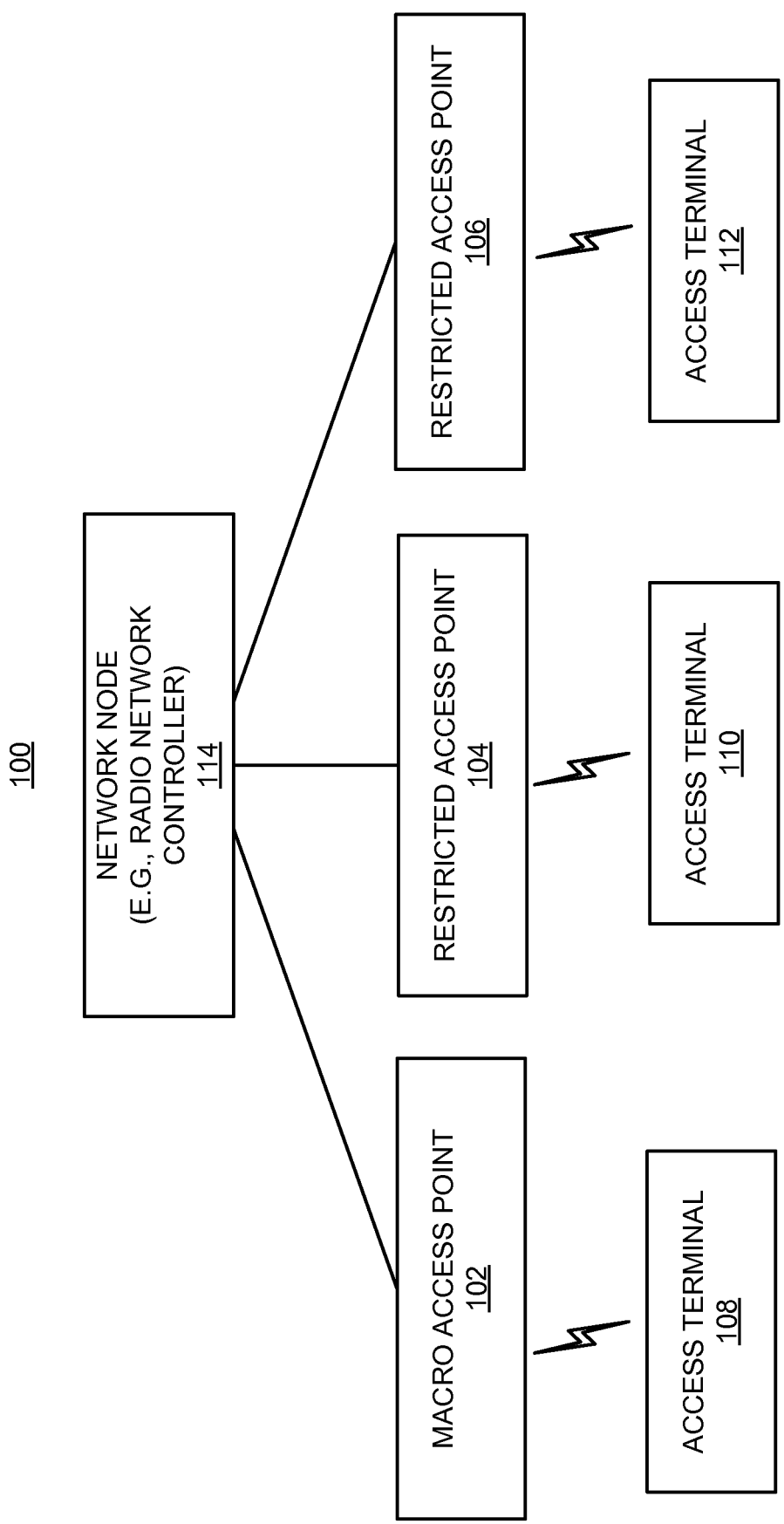
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates sample aspects of a communication system 100 where distributed nodes (e.g., access points 102, 104, and 106) provide wireless connectivity for other nodes (e.g., access terminals 108, 110, and 112) that may be installed in or that may roam throughout an associated geographical area. In some aspects, the access points 102, 104, and 106 may communicate with one or more network nodes (e.g., a centralized network controller such as network node 114) to facilitate wide area network connectivity.

An access point such as access point 104 may be restricted whereby only certain access terminals (e.g., access terminal 110) are allowed to access the access point, or the access point may be restricted in some other manner. In such a case, a restricted access point and/or its associated access terminals (e.g., access terminal 110) may interfere with other nodes in the system 100 such as, for example, an unrestricted access point (e.g., macro access point 102), its associated access terminals (e.g., access terminal 108), another restricted access point (e.g., access point 106), or its associated access terminals (e.g., access terminal 112). For example, the closest access point to given access terminal may not be the serving access points for that access terminal. Consequently, transmissions by that access terminal may interfere with reception at the access terminal. As discussed herein, fraction reuse, power control and other techniques may be employed to mitigate interference.

Sample operations of a system such as the system 100 will be discussed in more detail in conjunction with the flowchart of FIG. 2. For convenience, the operations of FIG. 2 (or any other operations discussed or taught herein) may be described as being performed by specific components (e.g., components of the system 100 and/or components of a system 300 as shown in FIG. 3). It should be appreciated, however, that these operations may be performed by other types of components and may be performed using a different number of components. It also should be appreciated that one or more of the operations described herein may not be employed in a given implementation.

For illustration purposes various aspects of the disclosure will be described in the context of a network node, an access point, and an access terminal that communicate with one another. It should be appreciated, however, that the teachings herein may be applicable to other types of apparatuses or apparatuses that are referred to using other terminology.

FIG. 3 illustrates several sample components that may be incorporated into the network node 114 (e.g., a radio network controller), the access point 104, and the access terminal 110 in accordance with the teachings herein. It should be appreciated that the components illustrated for a given one of these nodes also may be incorporated into other nodes in the system 100.

The network node 114, the access point 104, and the access terminal 110 include transceivers 302, 304, and 306, respectively, for communicating with each other and with other nodes. The transceiver 302 includes a transmitter 308 for sending signals and a receiver 310 for receiving signals. The transceiver 304 includes a transmitter 312 for transmitting signals and a receiver 314 for receiving signals. The transceiver 306 includes a transmitter 316 for transmitting signals and a receiver 318 for receiving signals.

In a typical implementation, the access point 104 communicates with the access terminal 110 via one or more wireless communication links and the access point 104 communicates with the network node 114 via a backhaul. It should be appreciated that wireless or non-wireless links may be employed between these nodes or other in various implementations. Hence, the transceivers 302, 304, and 306 may include wireless and/or non-wireless communication components.

The network node 114, the access point 104, and the access terminal 110 also include various other components that may be used in conjunction with interference management as taught herein. For example, the network node 114, the access point 104, and the access terminal 110 may include interference controllers 320, 322, and 324, respectively, for mitigating interference and for providing other related functionality as taught herein. The interference controller 320, 322, and 324 may include one or more components for performing specific types of interference management. The network node 114, the access point 104, and the access terminal 110 may include communication controllers 326, 328, and 330, respectively, for managing communications with other nodes and for providing other related functionality as taught herein. The network node 114, the access point 104, and the access terminal 110 may include timing controllers 332, 334, and 336, respectively, for managing communications with other nodes and for providing other related functionality as taught herein. The other components illustrated in FIG. 3 will be discussed in the disclosure that follows.

For illustrations purposes, the interference controller 320 and 322 are depicted as including several controller components. In practice, however, a given implementation may not employ all of these components. Here, a HARQ controller component 338 or 340 may provide functionality relating to HARQ interlace operations as taught herein. A profile controller component 342 or 344 may provide functionality relating to transmit power profile or receive attenuation operations as taught herein. A timeslot controller component 346 or 348 may provide functionality relating to timeslot portion operations as taught herein. A spectral mask controller component 350 or 352 may provide functionality relating to spectral mask operations as taught herein. A spreading code controller component 354 or 356 may provide functionality relating to spreading code operations as taught herein. A transmit power controller component 358 or 360 may provide functionality relating to transmit power operations as taught herein. An attenuation factor controller component 362 or 364 may provide functionality relating to attenuation factor operations as taught herein.

Figure 2:
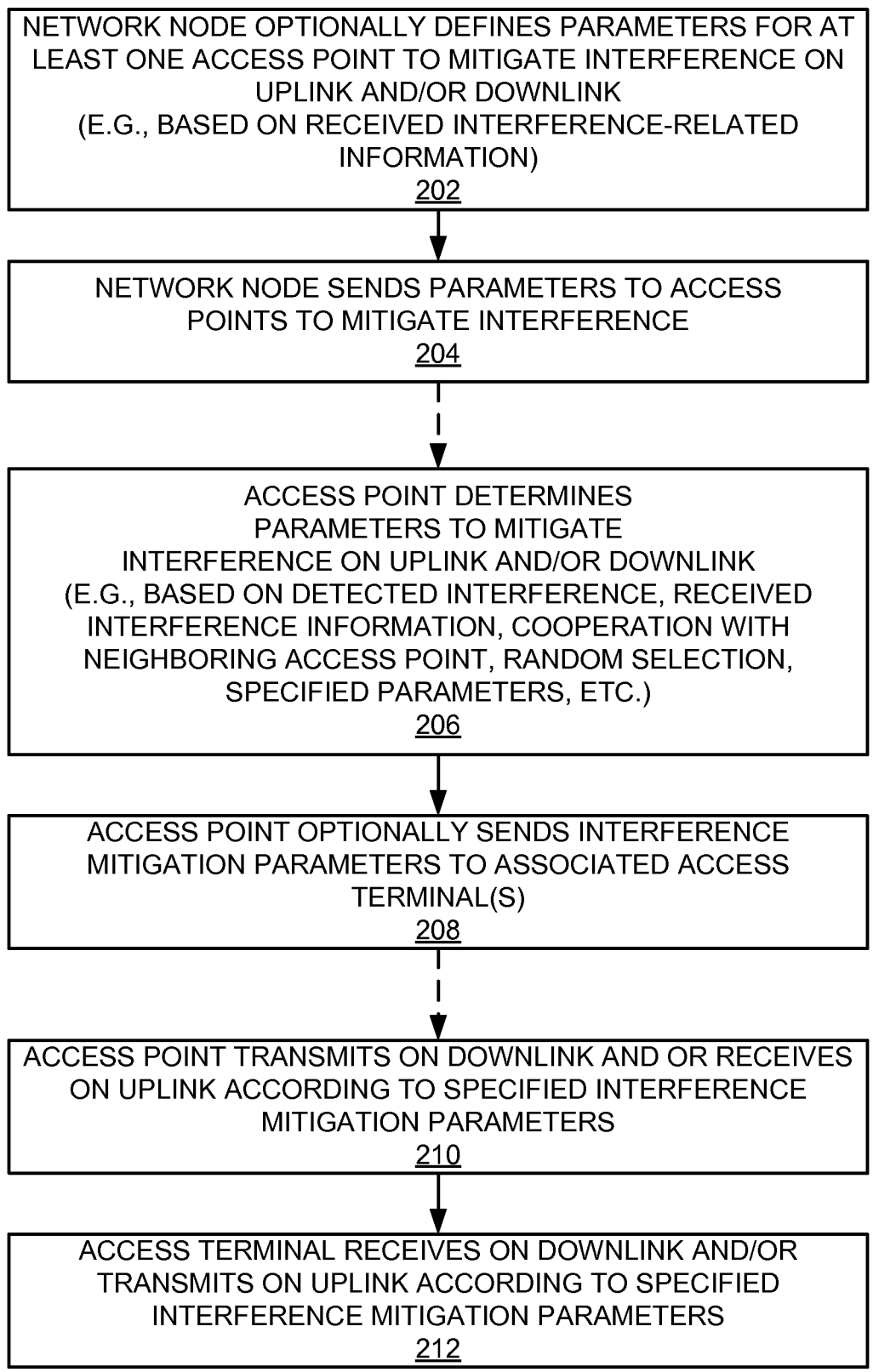
FIG. 2 is a simplified block diagram illustrating several sample aspects of components in a sample communication system.
Figure 3:
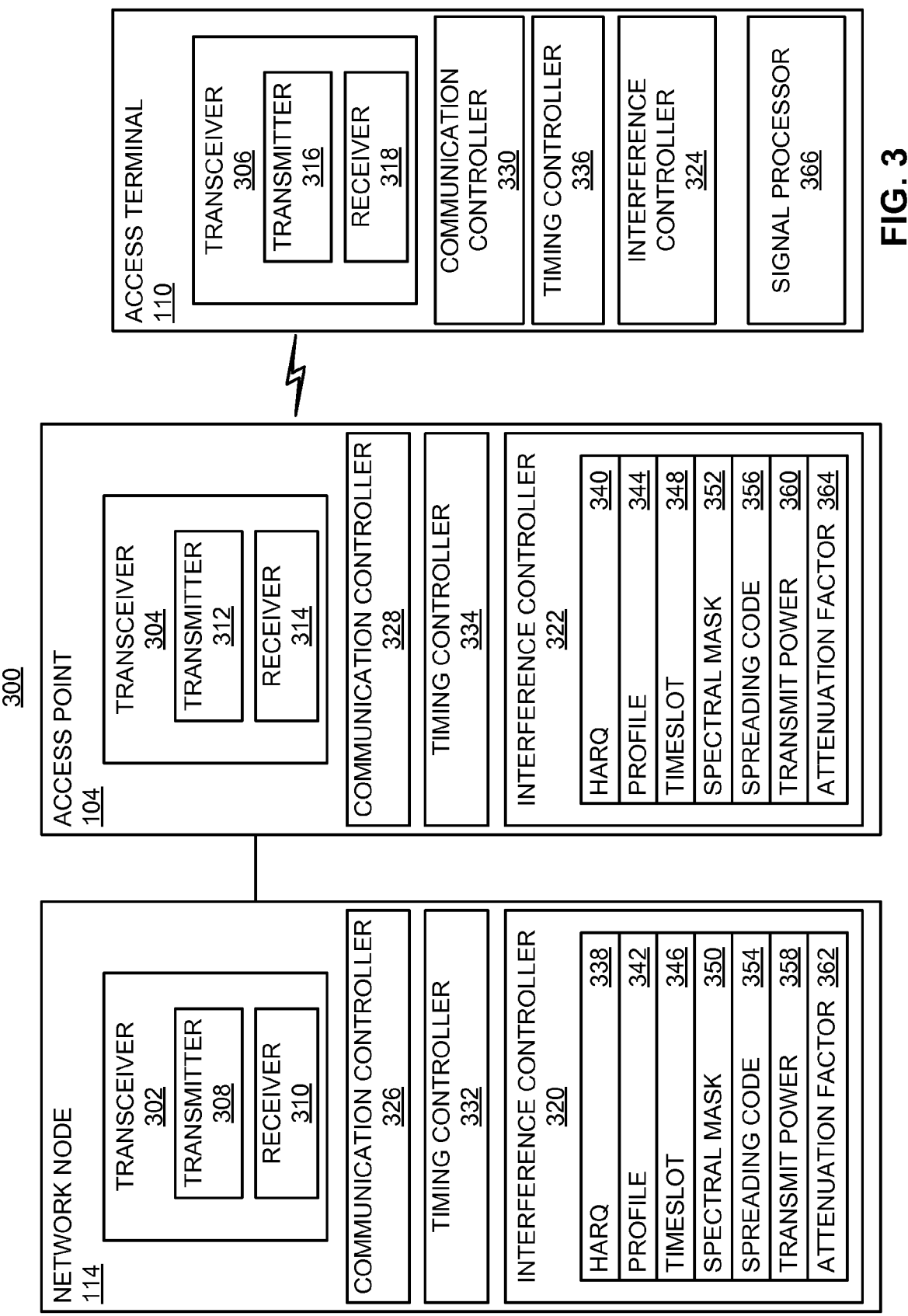
FIG. 3 is a flowchart of several sample aspects of operations that may be performed to manage interference.

FIG. 2 illustrates how the network node 114, the access point 104, and the access terminal 110 may interact with one another to provide interference management (e.g., interference mitigation). In some aspects, these operations may be employed on an uplink and/or on a downlink to mitigate interference. In general, one or more the techniques described by FIG. 2 may be employed in the more specific implementations that are described in conjunction with FIGS. 4-18 below. Hence, for purposes of clarity, the descriptions of the more specific implementations may not describe these techniques again in detail.

As represented by block 202, the network node 114 (e.g., the interference controller 320) may optionally define one or more interference management parameters for the access point 104 and/or the access terminal 110. Such parameters may take various forms. For example, in some implementations the network node 114 may define fractional reuse parameters for mitigating interference on an uplink and/or a downlink. As mentioned herein, such fractional reuse may involve one or more of HARQ interlaces, puncturing, frequency spectrum, or spreading codes. In some implementations the network node 114 may define other types of interference management information such as, for example, transmit power parameters, and receive attenuation parameters. Examples of such parameters will be described in more detail below in conjunction with FIGS. 4-18.

In some aspects, the definition of interference parameters may involve determining how to allocate one or more resources. For example, the operations of block 402 may involve defining how an allocated resource (e.g., a frequency spectrum, etc.) may be divided up for fractional reuse. In addition, the definition of fraction reuse parameters may involve determining how much of the allocated resource (e.g., how many HARQ interlaces, etc.) may be used by any one of a set of access points (e.g., restricted access points). The definition of fraction reuse parameters also may involve determining how much of the resource may be used by a set of access points (e.g., restricted access points).

In some aspects, the network node 114 may define a parameter based on received information that indicates whether there may be interference on an uplink or a downlink and, if so, the extent of such interference. Such information may be received from various nodes in the system (e.g., access points and/or access terminals) and in various ways (e.g., over a backhaul, over-the-air, and so on).

For example, in some cases one or more access points (e.g., the access point 104) may monitor an uplink and/or a downlink and send an indication of interference detected on the uplink and/or downlink to the network node 114 (e.g., on a repeated basis or upon request). As an example of the former case, the access point 104 may calculate the signals strength of signals it receives from nearby access terminals that are not associated with (e.g., served by) the access point 104 (e.g., access terminals 108 and 112) and report this to the network node 114.

In some cases, each of the access points in the system may generate a load indication when they are experiencing relatively high loading. Such an indication may take the form of, for example, a busy bit in 1×EV-DO, a relative grant channel ("RGCH") in 3GPP, or some other suitable form. In a conventional scenario, an access point may send this information to its associated access terminal via a downlink. However, such information also may be sent to the network node 114 (e.g., via the backhaul).

In some cases, one or more access terminals (e.g., the access terminal 110) may monitor downlink signals and provide information based on this monitoring. The access terminal 110 may send such information to the access point 104 (e.g., which may forward the information to the network node 114) or to the network node 114 (via the access point 104). Other access terminals in the system may send information to the network node 114 in a similar manner.

In some cases, the access terminal 110 may generate measurement reports (e.g., on repeated basis). In some aspects, such a measurement report may indicate which access points the access terminal 110 is receiving signals from, a received signal strength indication associated with the signals from each access point (e.g., Ec/Io), the path loss to each of the access points, or some other suitable type of information. In some cases a measurement report may include information relating to any load indications the access terminal 110 received via a downlink.

The network node 114 may then use the information from one or more measurement reports to determine whether the access point 104 and/or the access terminal 110 are relatively close to another node (e.g., another access point or access terminal). In addition, the network node 114 may use this information to determine whether any of these nodes interfere with any other one of these nodes. For example, the network node 114 may determine received signal strength at a node based on the transmit power of a node that transmitted the signals and the path loss between these nodes.

In some cases, the access terminal 110 may generate information that is indicative of the signal to noise ratio (e.g., signal and interference to noise ratio, SINR) on a downlink. Such information may comprise, for example a channel quality indication ("CQI"), a data rate control ("DRC") indication, or some other suitable information. In some cases, this information may be sent to the access point 104 and the access point 104 may forward this information to the network node 114 for use in interference management operations. In some aspects, the network node 114 may use such information to determine whether there is interference on a downlink or to determine whether interference in the downlink is increasing or decreasing.

As will be described in more detail below, in some cases the interference-related information may be used to determine how to deploy fractional reuse to mitigate interference. As one example, CQI or other suitable information may be received on a per-HARQ interlace basis whereby it may be determined which HARQ interlaces are associated with the lowest level of interference. A similar technique may be employed for other fractional reuse techniques.

It should be appreciated that the network node 114 may define parameters in various other ways. For example, in some cases the network node 114 may randomly select one or more parameters.

As represented by block 204, the network node 114 (e.g., the communication controller 326) sends the defined interference management parameters to the access point 104. As will be discussed below, in some cases the access point 104 uses these parameters and in some cases the access point 104 forwards these parameters to the access terminal 110.

In some cases, the network node 114 may manage interference in the system by defining the interference management parameters to be used by two or more nodes (e.g., access points and/or access terminals) in the system. For example, in the case of a fractional reuse scheme, the network node 114 may send different (e.g., mutually exclusive) interference management parameters to neighboring access points (e.g., access points that are close enough to potentially interfere with one another). As a specific example, the network node 114 may assign a first HARQ interlace to the access point 104 and assign a second HARQ interlace to the access point 106. In this way, communication at one restricted access point may not substantially interfere with communication at the other restricted access point. Similar techniques may be employed for other fractional reuse schemes and for access terminals in the system.

As represented by block 206, the access point 104 (e.g., the interference controller 322) determines interference management parameters that it may use or that may send to the access terminal 110. In cases where the network node 114 defines the interference management parameters for the access point 104, this determination operation may simply involve receiving the specified parameters and/or retrieving the specified parameters (e.g., from a data memory).

In some cases the access point 104 determines the interference management parameters on its own. These parameters may be similar to the parameters discussed above in conjunction with block 202. In addition, in some cases these parameters may be determined in a similar manner as discussed above at block 202. For example, the access point 104 may receive information (e.g., measurement reports, CQI, DRC) from the access terminal 110. In addition, the access point 104 may monitor an uplink and/or a downlink to determine the interference on such a link. The access point 104 also may randomly select a parameter.

In some cases, the access point 104 may cooperate with one or more other access points to determine an interference management parameter. For example, in some cases the access point 104 may communicate with the access point 106 to determine which parameters are being used by the access point 106 (and thereby selects different parameters) or to negotiate the use of different (e.g., mutually exclusive) parameters. In some cases, the access point 104 may determine whether it may interfere with another node (e.g., based on CQI feedback that indicates that another node is using a resource) and, if so, define its interference management parameters to mitigate such potential interference.

As represented by block 208, the access point 104 (e.g., the communication controller 328) may send interference management parameters or other related information to the access terminal 110. For example, in some cases this information may indicate how fractional reuse is deployed (e.g., which HARQ interlaces are to be used, which spectral mask is to be used, etc.) on an uplink or downlink between the access point 104 and the access terminal 110. In some cases this information may relate to power control (e.g., specifies uplink transmit power).

As represented by blocks 210 and 212, the access point 104 may thus transmit to the access terminal 110 on the downlink or the access terminal 110 may transmit to the access point 104 on the uplink. Here, the access point 104 may use its interference management parameters to transmit on the downlink and/or receive on the uplink. Similarly, the access terminal 110 may take these interference management parameters into account when receiving on the downlink or transmitting on the uplink.

In some implementations the access terminal 110 (e.g., the interference controller 306) may define one or more interference management parameters. Such a parameter may be used by the access terminal 110 and/or sent (e.g., by the communication controller 330) to the access point 104 (e.g., for use during uplink operations).

Figure 4:
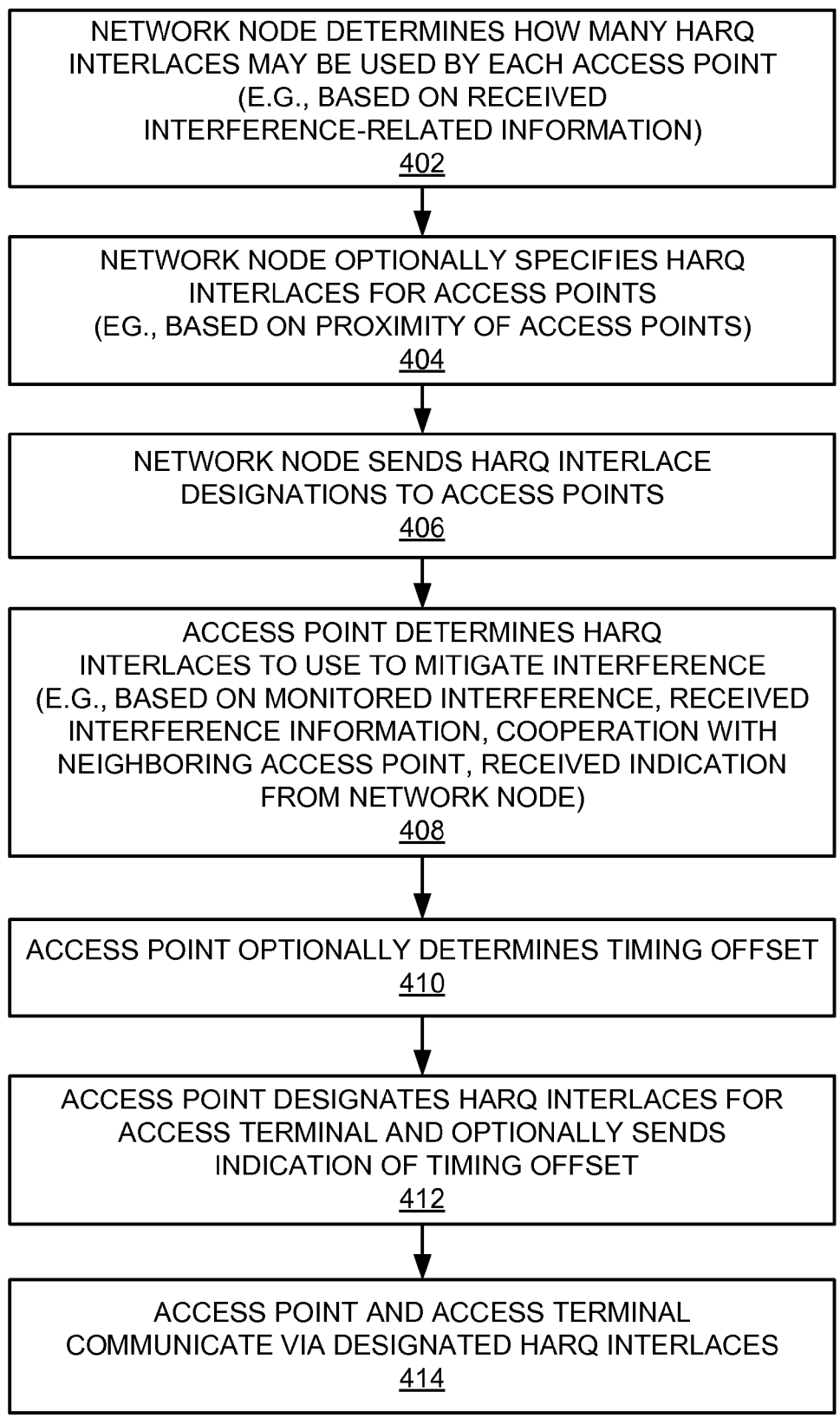
FIG. 4 is a flowchart of several sample aspects of operations that may be performed to manage interference through the use of HARQ interlace-based fractional reuse.

Referring now to FIG. 4, operations relating to the use of a fractional reuse scheme employing HARQ interlaces on an uplink or a downlink will be described in more detail. In some aspects the system 100 may employ time division multiplexing whereby information may be transmitting on one or more defined timeslots. Such timeslots may take various forms and/or be referred to using various terminology. As an example, in various implementations a timeslot may relate to or be referred to as a frame, a subframe, a slot, a transmission time interval ("TTI"), an HARQ interlace, and so on. As an example, a predetermined number of timeslots (e.g., TTIs) 1 through 16 may be monitored and used for downlink transmission. A similar scheme may be used for uplink transmission.

Based on traffic and associated interference levels on the monitored slots, and based on application of one or more of the schemes taught herein, uplink or downlink transmission may be limited to a defined number of slots N, where N=8, for example, lower than the total number of slots M, where M=16, for example. In some aspects such a fractional reuse scheme may utilize HARQ interlaces.

In a conventional 1×EV-DO system, each HARQ process may be assigned, for example, every fourth subframe, such that HARQ retransmissions of an original transmission in subframe "n" are performed in slots (n+4), (n+8), (n+12), etc. As a specific example, HARQ interlace 1 may be assigned subframes 1, 5, 9, and so on. In the event an original data transmission for HARQ interlace 1 during subframe 1 is unsuccessful, a negative acknowledgement ("NACK") signal may be sent on a complementary link (e.g., an uplink in the case of a downlink HARQ transmission). The data may then be retransmitted during subframe 5 of the same HARQ interlace 1 and, upon a successful transmission, an acknowledgement ("ACK") signal is received (e.g., via an uplink). Similar operations may be performed by other HARQ processes on the other HARQ interlaces 2, 3, and 4.

In some aspects, a fractional reuse scheme may utilize HARQ interlaces to configure neighboring nodes (e.g., access points and/or access terminals) to transmit at different times. For example, a first access point may transmit during HARQ interlaces 1 and 2 while a second access point transmits during HARQ interlaces 3 and 4. As a result, interference that may otherwise occur between the nodes may be reduced.

As represented by block 402 of FIG. 4, the network node 114 (e.g., an HARQ control component 338 of the interference controller 320) determines how many HARQ interlaces may be used by each access point (e.g., in a set of restricted access points). For example, a defined number "N" of HARQ interlaces lower than the total number "M" of HARQ interlaces allocated for the set may be determined based on interference-related feedback from one or more access points and/or access terminals in the system (e.g. as discussed above in conjunction with FIG. 2). Thus, at any given time, the number N of downlink (or uplink) HARQ interlaces out of the total number M of HARQ interlaces may be defined based on the downlink (or uplink) activity of neighboring nodes on the M HARQ interlaces.

N may be a fixed value or dynamically defined. In a case where M=4, N may be dynamically set between a minimum value $N_{MIN}$ greater than zero and a maximum value $N_{MAX}$ lower than 4. In some cases the value N may be randomly determined. Typically, however, the value N may be selected in an effort to more effectively mitigate interference between nodes in the system. The determination of the value N may be based on various criteria.

For example, one criterion may relate to how access points are deployed in the system (e.g., the total number of access points, the density of access points within a given area, the relative proximity of the access points, and so on). Here, if there are a large number of nodes that are close to one another, a smaller value of N may be used so that neighboring nodes may be less likely to use the same HARQ interlaces. Conversely, if there are a small number of nodes in the system, a larger value of N may be defined to improve communication performance (e.g., throughput).

Another criterion may relate to the traffic (e.g., the amount of traffic, the types of traffic, the quality of service requirements of the traffic) handled by the access points. For example, some types of traffic may be more sensitive to interference than other types of traffic. In such a case, a smaller value of N may be used. In addition, some types of traffic may have stricter throughput requirements (but less sensitivity to interference) whereby a larger value for N may be used.

In some cases the network node 114 may define the value N based on received interference-related information (e.g., as discussed at FIG. 2). For example, the number of access points heard by given access terminal and the relative proximity of the access points to the access terminal may be determined based on measurement reports received from the access terminal. In this way, the network node 114 may determine whether transmissions at a given cell (e.g., by a restricted access point or its associated access terminals) may interfere with a neighboring cell and define N accordingly).

The network node 114 also may define N based on interference information received from one or more access points (e.g., as discussed at FIG. 2). For example, if interference values are high, a lower value of N may be defined. In this way, the number of HARQ interlaces used by a given access point may be reduced thereby reducing the probability of interference on each set of N HARQ interlaces out of the total number of HARQ interlaces M.

As represented by block 404, in some cases the network node 114 may specify specific HARQ interlaces to be used by specific access points. For example, the network node 114 may determine the amount of interference that may be seen on each of the M HARQ interlaces by a given access point and assign HARQ interlaces having lower interference to that access point. As a specific example, the network node 114 may determine that downlink transmission by the access point 106 on the two HARQ interlaces (e.g., interlaces 3 and 4) that it is using may interfere with reception at the access terminals associated with the access point 104. This may be determined, for example, based on the downlink interference-related information that the network node may acquire as discussed herein. The network node 114 may then designate HARQ interlaces 1 and 2 for use by the access point 104.

As mentioned above, the determination of interference on each HARQ interlace may be based on signals received by the network node 114. For example, the likelihood of interference between nodes may be determined based on one or more measurement reports received from one or more access terminals as discussed herein. In addition, for the downlink, access terminals in the system may generate channel quality indication ("CQI") or data rate control ("DRC") information for each HARQ interlace (e.g., for each TTI in 3GPP) and forward this information to the network node 114. Also for the downlink, an access terminal may monitor the downlink and provide interference-related information on a per-HARQ interlace (e.g., per-TTI) basis. Similarly, for the uplink an access terminal may monitor the uplink and provide interference-related information on a per-HARQ interlace (e.g., per-TTI) basis. In some cases (e.g., DRC feedback in 3GPP2), the feedback from an access terminal may not provide per-HARQ interlace resolution. In such a case, ACK/NACK feedback or some other type of feedback may be employed to identify a desired set of HARQ interlaces. As another example, downlink data rate may be adjusted on a given HARQ interlace to determine the rate at which the access terminal can successfully decode the data (e.g., with a given accuracy). Based on the best data rate determined for each HARQ interlace, an assumption may be made as to which HARQ interlace will provide the best performance for a given access point. Alternatively, a centralized HARQ interlace selection scheme may be employed (e.g., where the network node designates the HARQ interlaces for neighboring nodes as discussed herein).

In some aspects, the designation of specific HARQ interlaces by the network node 114 may be dependent on whether the corresponding uplink or downlink traffic is synchronized. Such synchronization may be achieved, for example, using an adjustment such as Tau-DPCH (where DPCH relates to a dedicated physical channel) or some other suitable synchronization scheme.

In some aspects, the network node 114 may designate consecutive HARQ interlaces for a given access points. In this way, in the event the uplink or downlink traffic of different nodes is not synchronized, at least a portion of the designated HARQ interlaces may not be subject to interference. As an example, if HARQ interlaces 1-4 are assigned to a first access point and HARQ interlaces 5-8 are assigned to a second access point, these access points will not be subjected to interference from the other access point on at least three of HARQ interlaces even if the timing of the access points is not synchronized.

As represented by block 406, the network node 114 then sends the HARQ interlace parameters it defined to one or more access points. For example, a network node 114 may send a node-specific designation to each access point or the network node 114 may send a common designation to all of the access points in a set of access points.

As represented by block 408, the access point 104 (e.g., a HARQ control component 340 of the interference controller 322) determines the HARQ interlaces it will use for uplink or downlink communication. Here, the access point 104 will have received the value N from the network node 114. In the event the network node 114 designated the HARQ interlaces to be used by the access point 104 the access point 104 may simply use these HARQ interlaces. In some cases, the access point 104 may randomly select a parameter.

If the HARQ interlaces were not designated by the network node 114 or selected randomly, the access point 104 may determine which N HARQ interlaces to use based on appropriate criteria. Initially, this determination is thus based on (e.g., constrained by) the value N. In some cases the access point 104 may define or adapt N (e.g., based on criteria as discussed above).

In some cases the access point 104 may select the HARQ interlaces associated with the lowest interference. Here, the access point 104 may determine which HARQ interlaces to use in a similar manner as discussed above. For example, the access point 104 may receive information (e.g., measurement reports, CQI, DRC) from the access terminal 110. In addition, the access point 104 may monitor an uplink and/or a downlink to determine the interference on such a link. For example, when the access point 104 is idle, it may monitor uplink interference (load) from out-of-cell. In this way, the access point 104 may select the HARQ interlaces that provide minimal out-of-cell interference.

In some cases, the access point 104 may cooperate with one or more other access points to determine the HARQ interlaces it will use. For example, the access point 104 and the access point 106 may negotiate to use different (e.g., mutually exclusive) HARQ interlaces.

As represented by block 410, the access point 104 may determine a timing offset to use for uplink or downlink communication. For example, the access point 104 may continuously monitor a link over a period of time to determine approximately when a neighboring node commences and ends its transmissions. In this way, the access point 104 may determine (e.g., estimate) the timeslot timing of the neighboring node. The access point may then synchronize the timeslot timing of its uplink or downlink to that time. In some aspects this may be involve defining a Tau-DPCH parameter.

In some cases (e.g., 3GPP), access points may synchronize their timing (e.g., HS-PDSCH timing) by time aligning their P-CCPCHs (primary-common control physical channel). Such synchronization may be achieved, for example, through the use of GPS components in each access point, timing signaling between access points (which may be relatively effective for neighboring access points, e.g., with tens of meters of one another), or some other technique.

In some cases (e.g., in HSDPA), overhead may be relatively high and not orthogonal to traffic. Here, discontinuous transmission or reception (DTX or DRX) may be employed whereby overhead is not transmitted during the DTX/DRX period. In such cases, transmission for CCPCH and EHICH may be accounted for and access terminals may be configured to account for the lower CPICH Ec/Io measurements they may see from access points employing DTX/DRX.

As represented by block 412, the access point 104 may send a message to an associated access terminal to inform the access terminal which HARQ interlaces are to be used for the uplink or downlink. In some implementations, the access point 104 may use E-AGCH (enhanced-absolute grant channel) or some other similar mechanism to send the HARQ interlaces designations to its associated access terminals. For example, the access point 104 may set Xags=1 to specify which TTIs the access terminal is to use. In addition, the access point 104 may send an indication of the timing offset (e.g., Tau-DPCH) determined at block 410 to the access terminal. In this way, the access point may schedule data transmissions (uplink or downlink) on the best N HARQ interlaces out of the available M HARQ interlaces (block 414).

The HARQ interlace parameters (e.g., N and the specific HARQ interlaces used by a given node) described above may be adjusted over time. For example, the information described above may be collected on a repeated basis and the parameters adjusted accordingly (e.g., with hysteresis and/or slow filtering if desired). In this way, the HARQ interlaces may be deployed in a manner that accounts for current interference conditions in the system.

In some implementations HARQ interlaces may be allocated in a hierarchical manner. For example, if no restricted access points are deployed in a coverage area of a macro access point, a full set of HARQ interlaces (e.g., 8) may be allocated for a macro access point. In the event restricted access points are deployed in the coverage area of the macro access point, however, one portion of the HARQ interlaces (e.g., 5) may be allocated for macro coverage and another portion of the HARQ interlaces (e.g., 3) may be allocated for the restricted access points. The HARQ interlaces allocated for the restricted access points may then be allocated among the restricted access points (e.g., N=1) as described above. The number of HARQ interlaces allocated in this way may be defined (e.g., in a fixed manner or dynamically adjusted) based on various criteria as discussed herein (e.g., restricted access point deployment, traffic, interference, etc.). For example, as the number of restricted access points in the system or the amount of traffic at the restricted access points increases the number of HARQ interlaces allocated for these access points may be increased.

Figure 5:
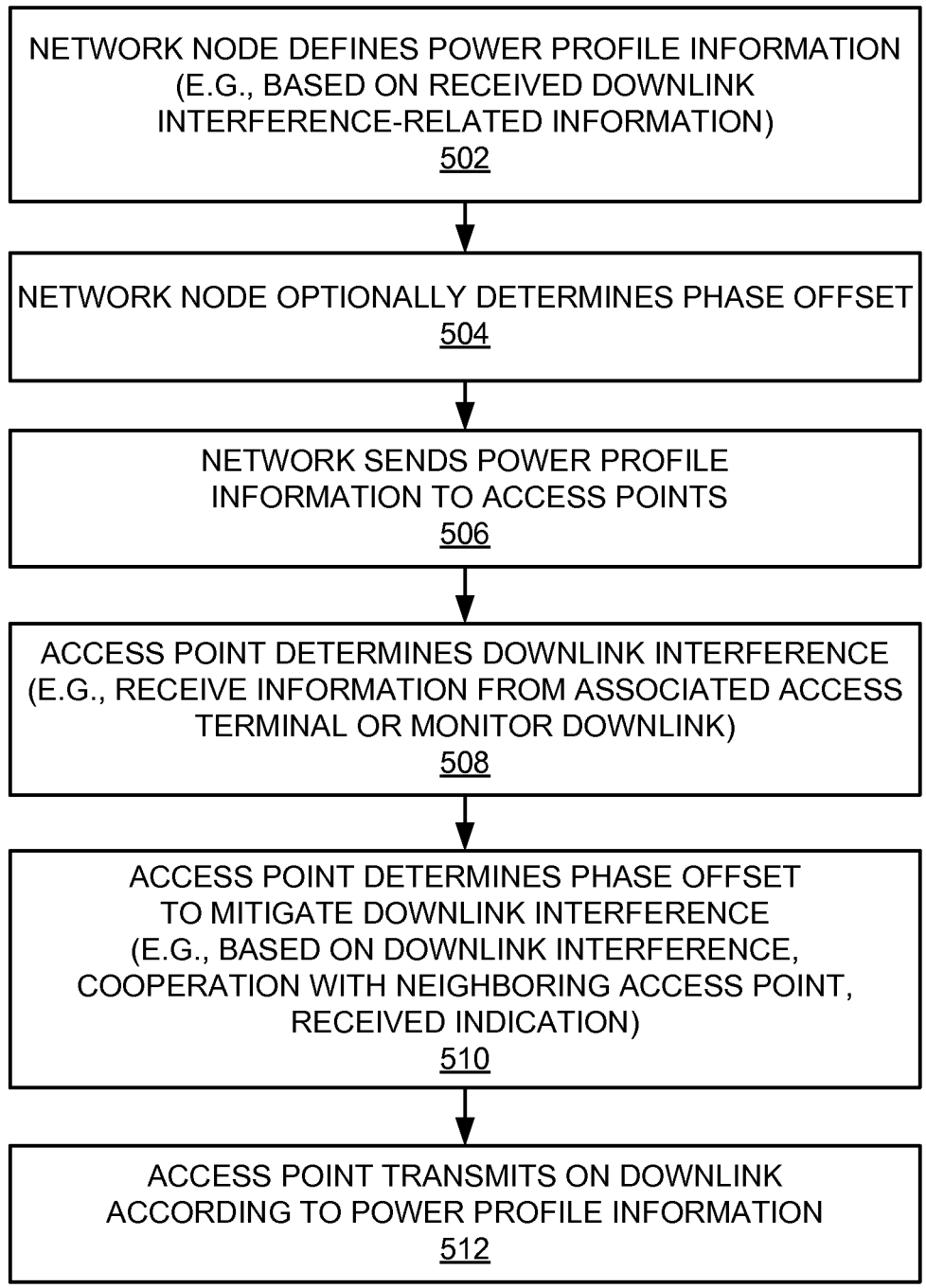
FIG. 5 is a flowchart of several sample aspects of operations that may be performed to manage interference through the use of a transmit power profile.
Figure 6:
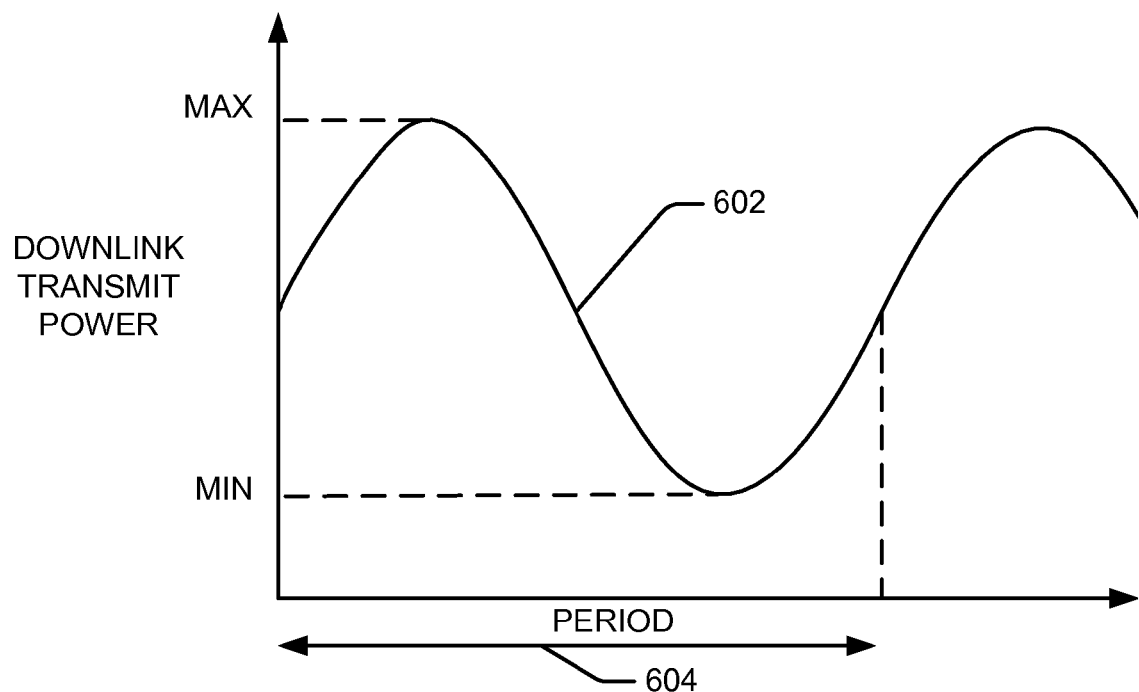
FIG. 6 is a simplified diagram illustrating several aspects of a sample transmit power profile.

Referring now to FIGS. 5 and 6, operations relating to the use of a scheme for varying transmit power (e.g., downlink transmit power) over time to mitigate interference will be described in more detail. In some aspects this scheme involves defining a transmit power profile such as the profile 602 shown in FIG. 6 that defines different power levels over time. Such a profile may take various forms and be defined in various ways. For example, in some cases a profile may comprise a set of values that define the transmit power for different points in time. In some cases a profile may be defined by an equation (e.g., a sinusoidal waveform). In some aspects a profile may be periodic. As shown in FIG. 6, a maximum value (MAX), a minimum value (MIN) and a period 604 may be defined for the profile.

A transmit power profile may be used to control transmit power in different ways. For example, in some cases the transmit power profile is used to control total transmit power. In some implementations, overhead channels (e.g., CPICH, etc.) and dedicated channels may operate at a constant power. Leftover power according to the transmit power profile may then be shared among the other channels (e.g., HS-SCCH and HS-PDSCH). In some implementations overhead channels may be scaled.

As described in more detail below, in some aspects transmit power-based fractional reuse may be achieved through the use of a transmit power profile. For example, neighboring access points may use the same profile (or a similar profile) but do so based on different phases of the profile. For example, a first access point may transmit according to the profile shown in FIG. 6 while a second access point transmits using the same profile shifted by 180 degrees. Thus, when the first access point is transmitting at maximum power the second access point may be transmitting at minimum power.

As represented by block 502 of FIG. 5, the network node 114 (e.g., a profile control component 342 of the interference controller 320) defines (e.g., specifies) transmit power profile information to be used for wireless transmission (e.g., over a downlink). This information may include, for example, parameters such as the transmit power profile, initial minimum and maximum values, and an initial period value.

In some cases one or more of these parameters may be predefined or randomly determined. Typically, however, these parameters are selected in an effort to more effectively mitigate interference between nodes in the system. The determination of this information may be based on various criteria such as, for example, one or more measurement reports from one or more access terminals, one or more reports from one or more access points regarding the CQI reported by one or more associated access terminals, the number of active access terminals, and the average downlink traffic at each access point (e.g., in each cell).

As a specific example, the definition of a transmit power profile parameter may be based on how access points are deployed in the system (e.g., the total number of access points, the density of access points within a given area, the relative proximity of the access points, and so on). Here, if there are a large number of nodes that are close to one another the parameters may be defined so that neighboring nodes may be less likely to transmit at a high power at the same time. As an example, the transmit power profile may be shaped such that a given access point may transmit at or near maximum power for a relatively short period of time. In this way, the transmit power profile may provide adequate isolation when a large number of phase values (e.g., 60 degrees, 120 degrees, etc.) are used by various nodes in the system in conjunction with the transmit power profile. Conversely, if there are a small number of nodes in the system the parameters may be defined to improve communication performance (e.g., throughput). As an example, the transmit power profile may be shaped such that a given access point may transmit at or near maximum power for a longer period of time.

Different levels of isolation between neighboring access points (e.g., cells) also may be achieved by adjusting the magnitudes of the minimum and maximum parameters. For example, a larger max/min ratio provides better isolation at the expense of having longer periods of time where an access terminal is transmitting at a lower power level.

A transmit power profile parameter may be defined based on the traffic (e.g., the traffic load, the types of traffic, the quality of service requirements of the traffic) handled by the access points. For example, some types of traffic may be more sensitive to interference than other types of traffic. In such a case, a parameter (e.g., the transmit power profile or max/min) that provides higher isolation may be used (e.g., a discussed above). In addition, some types of traffic may have stricter throughput requirements (but less sensitivity to interference) whereby a transmit power profile that allows more transmissions at higher power levels may be used (e.g., a discussed above).

In some cases the network node 114 may define the transmit power profile parameters based on received interference-related information (e.g., feedback from one or more access points and/or access terminals in the system as discussed above in conjunction with FIG. 2). For example, the number of access points heard by given access terminal and the relative proximity of the access points to the access terminal may be determined based on measurement reports received from the access terminal. In this way, the network node 114 may determine whether transmissions at a given cell (e.g., associated with a restricted access point) may interfere with a neighboring cell and adjust the power profile parameters accordingly. The network node 114 also may define the parameters based on interference information received from one or more access points (e.g., as discussed at FIG. 2).

In some implementations the period parameter may be defined based on a tradeoff between any delay sensitivity of application data (e.g., VoIP) and CQI/DRC filtering/delay (e.g., the delay from the time SINR is measured to the time it is effective at a traffic scheduler for the access point). For example, if cells are carrying a large amount of VoIP traffic, the period may be set to correspond to the periodicity of VoIP packets. In some cases, a period in the range of 50-100 ms may be appropriate. In some implementations the period parameter may be defined based on the number of access terminals being serviced.

As represented by block 504, in some cases the network node 114 may specify specific phase offset values to be used by specific access points. For example, the network node 114 may determine the amount of interference that may be seen by a given access point when it uses different values of the phase offset (e.g., based on CQI reports received for each TTI). The phase offset associated with the lowest interference at that access point may then be assigned to that access point.

The network node 114 also may designate phase offset values for neighboring nodes in a manner that mitigates interference between the nodes. As a specific example, the network node 114 may determine that downlink transmission by the access point 106 may interfere with reception at an access terminal associated with the access point 104. This may be determined, for example, based on the downlink interference-related information that the network node 114 may acquire as discussed herein. The network node 114 may then designate different (e.g., 180 degrees out of phase) phase offset values for the access points 104 and 106.

As represented by block 506, the network node 114 then sends the power profile information it defined to one or more access points. Here, the network node 114 may send a node-specific designation to each access point or the network node 114 may send a common designation to all of the access points in a set of access points.

As represented by blocks 508 and 510, the access point 104 (e.g., a profile control component 344 of the interference controller 322) determines the transmit power profile parameters it will use for downlink communication. In the event the network node 114 designated all of the transmit power profile parameters to be used by the access point 104, the access point 104 may simply use these parameters. In some cases, the access point 104 may randomly select a parameter (e.g., the phase offset).

If all of the parameters were not designated by the network node 114 or selected randomly, the access point 104 may determine which parameters to use based on appropriate criteria. In a typical case, the access point may implement a tracking algorithm to dynamically determine a phase offset value to use in conjunction with the transmit power profile, minimum, maximum, and period parameters the access point 104 received from the network node 114.

In some cases the access point 104 may select the phase offset value that is associated with the lowest interference. Here, the access point 104 may determine which phase offset value to use in a similar manner as discussed above. For example, at block 508 the access point 104 may receive information (e.g., measurement reports, CQI, DRC) from the access terminal 110 and/or the access point 104 may monitor a link to determine the interference on the link. As an example of the latter case, when the access point 104 is idle, it may monitor interference (load) from out-of-cell on the downlink. In this way, the access point 104 may select the phase offset value that provides minimal out-of-cell interference at block 510.

In some cases, the access point 104 may cooperate with one or more other access points to determine the phase offset value. For example, the access point 104 and the access point 106 may negotiate to use different (e.g., out of phase) phase offset values. In such a case, the operations of block 508 may not be performed.

As represented by block 512, the access point transmits on the downlink based on the current transmit power profile.

Thus, the transmit power may vary over time in a manner that may mitigate interference with neighboring nodes.

The transmit power profile parameters (e.g., maximum, minimum, and period parameters defined by the network node 114) described above may be adjusted over time. For example, the information described above may be collected on a repeated basis and the parameters adjusted accordingly (e.g., with hysteresis and/or slow filtering if desired). In this way, transmit power of the access terminals in the system may be controlled in a manner that accounts for current interference conditions in the system. For example, if interference increases at a given node (e.g., as determined by CQI reports), the maximum power parameter may be reduced. In a simplified case, maximum_i is set equal to minimum_i for each access point_i. The network node 114 may then attempt to set these values to provide the same (or substantially the same) average CQI in each cell which may be achieved using the Ec_i,j/Io measurement of each access terminal_j from each access point_i.

Figure 7:
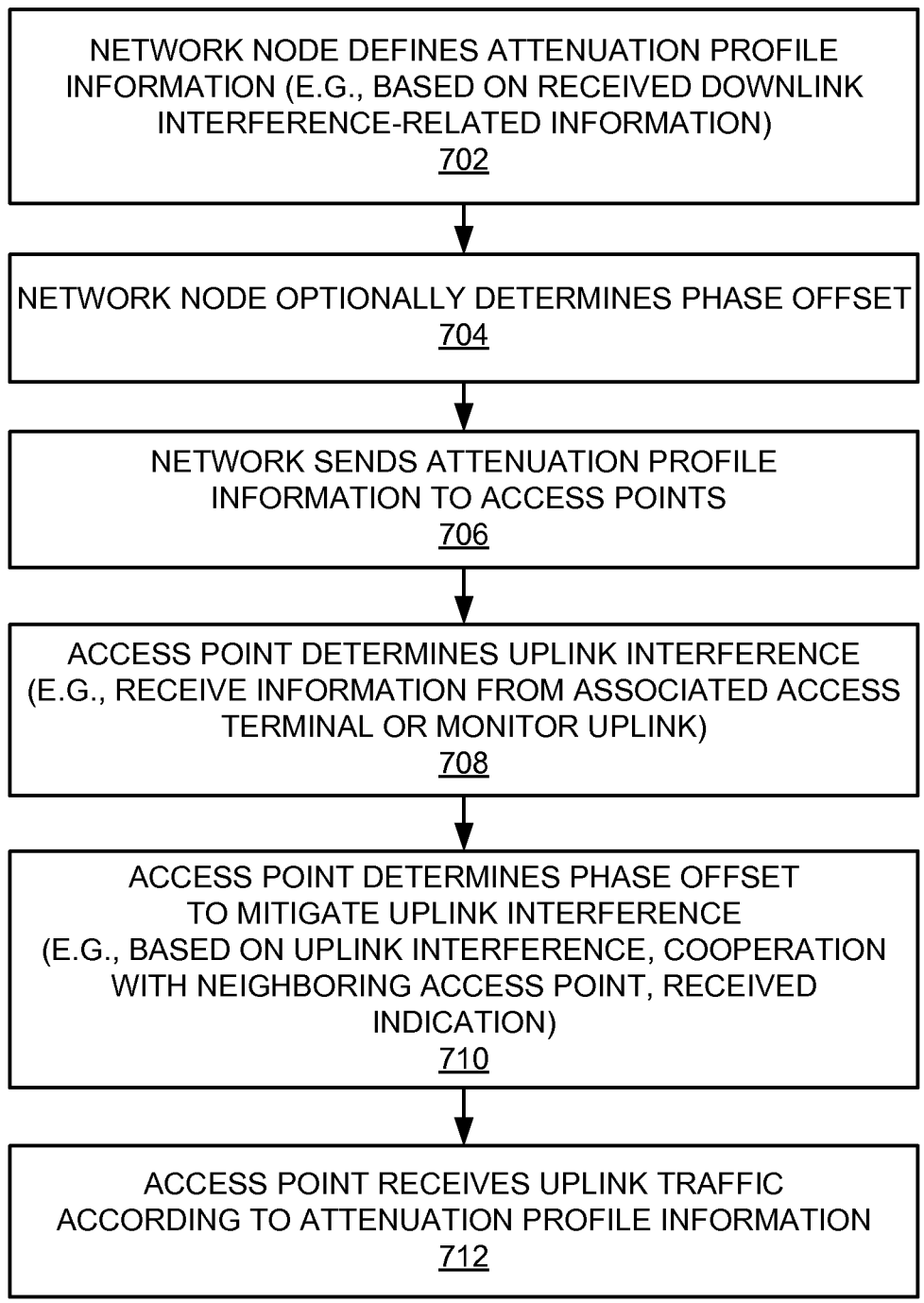
FIG. 7 is a flowchart of several sample aspects of operations that may be performed to manage interference through the use of a receive attenuation profile.
Figure 8:
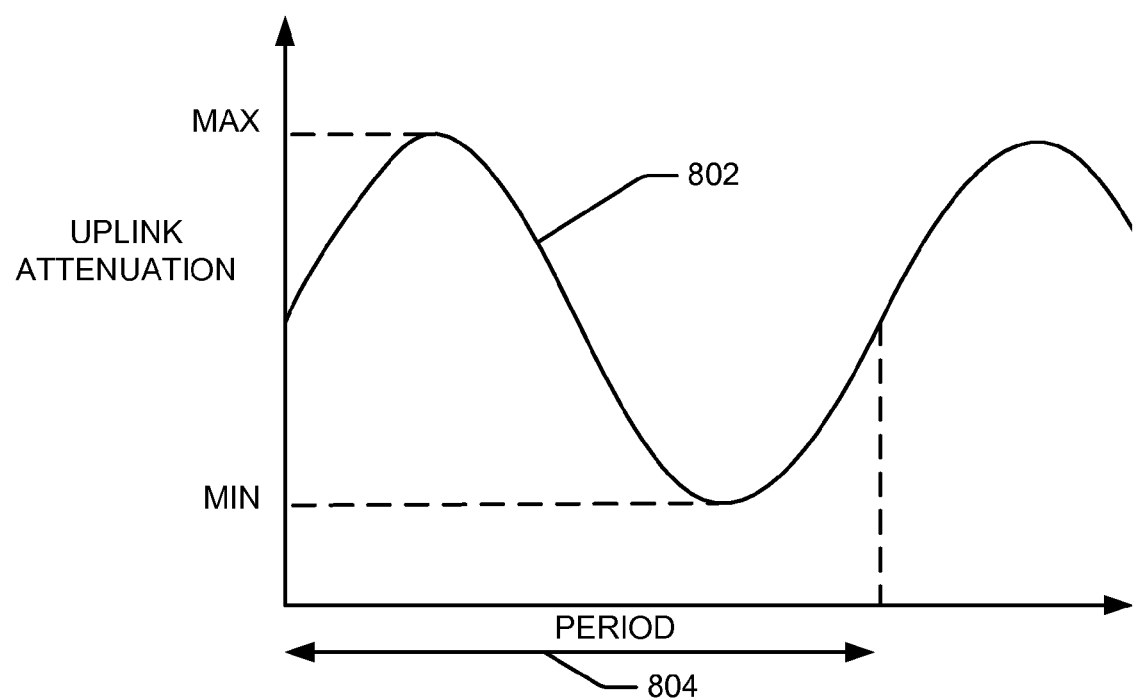
FIG. 8 is a simplified diagram illustrating several aspects of a sample receive attenuation profile.

Referring now to FIGS. 7 and 8, operations relating to the use of a scheme for varying receive attenuation (e.g., uplink attenuation) over time to mitigate interference will be described in more detail. In some aspects this scheme involves defining a receive attenuation profile such as the profile 802 shown in FIG. 8 that defines different attenuation levels over time. Such a profile may take various forms and be defined in various ways. For example, in some cases a profile may comprise a set of values that define the receive attenuation for different points in time. In some cases a profile may be defined by an equation (e.g., a sinusoidal waveform). As shown in FIG. 8, a maximum value (MAX), a minimum value (MIN) and a period 804 may be defined for the profile.

As described in more detail below, in some aspects receive attenuation-based fractional reuse may be achieved through the use of a receive attenuation profile. For example, neighboring access points may use the same profile (or a similar profile) but do so based on different phases of the profile. For example, a first access point may receive according to the profile shown in FIG. 8 while a second access point receives using the same profile shifted by 180 degrees. Thus, when the first access point is receiving at maximum attenuation the second access point may be receiving at minimum attenuation.

As represented by block 702 of FIG. 7, the network node 114 (e.g., a profile component 342 of the interference controller 320) defines receive attenuation profile information to be used for wireless reception (e.g., over an uplink). This information may include, for example, parameters such as the receive attenuation profile, initial minimum and maximum values, and an initial period value.

In some cases one or more of these parameters may be predefined or randomly determined. Typically, however, these parameters are selected in an effort to more effectively mitigate interference between nodes in the system. The determination of this information may be based on various criteria such as, for example, one or more measurement reports from one or more access terminals, one or more reports from one or more access points regarding the CQI reported by one or more associated access terminals, the number of active access terminals, and the average uplink traffic at each access point (e.g., in each cell).

As a specific example, the definition of a receive attenuation profile parameter may be based on how access points are deployed in the system (e.g., the total number of access points, the density of access points within a given area, the relative proximity of the access points, and so on). Here, if there are a large number of nodes that are close to one another the parameters may be defined so that neighboring nodes may be less likely to receive at a high attenuation level at the same time. As an example, the receive attenuation profile may be shaped such that a given access point may receive at or near maximum attenuation for a relatively short period of time. In this way, the receive attenuation profile may provide adequate isolation when a large number of phase values (e.g., 60 degrees, 120 degrees, etc.) are used by various nodes in the system in conjunction with the receive attenuation profile. Conversely, if there are a small number of nodes in the system the parameters may be defined to improve communication performance (e.g., throughput). As an example, the receive attenuation profile may be shaped such that a given access point may receive at or near a maximum attenuation level for a longer period of time.

Different levels of isolation between neighboring access points (e.g., cells) also may be achieved by adjusting the magnitudes of the minimum and maximum parameters. For example, a larger max/min ratio provides better isolation at the expense of having longer periods of time where an access terminal is receiving at a lower attenuation level.

A receive attenuation profile parameter may be defined based on the traffic (e.g., the traffic load, the types of traffic, the quality of service requirements of the traffic) handled by the access points. For example, some types of traffic may be more sensitive to interference than other types of traffic. In such a case, a parameter (e.g., the receive attenuation profile or max/min) that provides higher isolation may be used (e.g., a discussed above). In addition, some types of traffic may have stricter throughput requirements (but less sensitivity to interference) whereby a receive attenuation profile that allows more transmissions at higher attenuation levels may be used (e.g., a discussed above).

In some cases the network node 114 may define the receive attenuation profile parameters based on received interference-related information (e.g., feedback from one or more access points and/or access terminals in the system as discussed above in conjunction with FIG. 2). For example, the number of access points heard by given access terminal and the relative proximity of the access points to the access terminal may be determined based on measurement reports received from the access terminal. In this way, the network node 114 may determine whether transmissions at a given cell (e.g., associated with a restricted access point) may interfere with a neighboring cell and adjust the attenuation profile parameters accordingly. The network node 114 also may define the parameters based on interference information received from one or more access points (e.g., as discussed at FIG. 2).

In some implementations the period parameter may be defined based on a tradeoff between any delay sensitivity of application data (e.g., VoIP) and downlink control channel (e.g., CQI/DRC, ACK channel, etc.) filtering/delay as discussed above.

As represented by block 704, in some cases the network node 114 may specify specific phase offset values and/or other parameters discussed above to be used by specific access points. For example, the network node 114 may determine the amount of interference that may be seen by a given access point when it uses different values of the phase offset. The phase offset associated with the lowest interference at that access point may then be assigned to that access point.

The network node 114 also may designate phase offset values for neighboring nodes in a manner that mitigates interference between the nodes. As a specific example, the network node 114 may determine that uplink transmission by the access terminal 112 may interfere with reception at the access point 104. This may be determined, for example, based on the uplink interference-related information that the network node 114 may acquire as discussed herein. The network node 114 may then designate different (e.g., 180 degrees out of phase) phase offset values for the access points 104 and 106.

As represented by block 706, the network node 114 then sends the attenuation profile information it defined to one or more access points. Here, the network node 114 may send a node-specific designation to each access point or the network node 114 may send a common designation to all of the access points in a set of access points.

As represented by blocks 708 and 710, the access point 104 (e.g., a profile component 344 of the interference controller 322) determines the receive attenuation profile parameters it will use for uplink communication. In the event the network node 114 designated all of the receive attenuation profile parameters to be used by the access point 104, the access point 104 may simply use these parameters. In some cases, the access point 104 may randomly select a parameter (e.g., the phase offset).

If all of the parameters were not designated by the network node 114 or selected randomly, the access point 104 may determine which parameters to use based on appropriate criteria. In a typical case, the access point may implement a tracking algorithm to dynamically determine a phase offset value to use in conjunction with the receive attenuation profile, minimum, maximum, and period parameters the access point 104 received from the network node 114.

In some cases the access point 104 may select the phase offset value that is associated with the lowest interference. Here, the access point 104 may determine which phase offset value to use in a similar manner as discussed above. For example, at block 708 the access point 104 may receive information (e.g., measurement reports) from the access terminal 110 and/or the access point 104 may monitor a link to determine the interference on the link. As an example of the latter case, when the access point 104 is idle, it may monitor interference (load) from out-of-cell on the uplink. In this way, the access point 104 may select the phase offset value that provides minimal out-of-cell interference at block 710.

In some cases, the access point 104 may cooperate with one or more other access points to determine the phase offset value. For example, the access point 104 and the access point 106 may negotiate to use different (e.g., out of phase) phase offset values. In such a case, the operations of block 708 may not be performed.

As represented by block 712, the access point receives on the uplink based on the current receive attenuation profile (e.g., by applying the attenuation profile to received signals). Thus, the receive attenuation may vary over time in a manner that may mitigate interference with neighboring nodes.

The receive attenuation profile parameters (e.g., maximum, minimum, and period parameters defined by the network node 114) described above may be adjusted over time. For example, the information described above may be collected on a repeated basis and the parameters adjusted accordingly (e.g., with hysteresis and/or slow filtering if desired). In this way, receive attenuation of the access terminals in the system may be controlled in a manner that accounts for current interference conditions in the system. For example, the attenuation (e.g., maximum attenuation) may be increased as the received signal power level at one or more access points increases. In a simplified case, maximum_i is set equal to minimum_i for each access point_i and controlled in a similar manner as discussed above.

Figure 9:
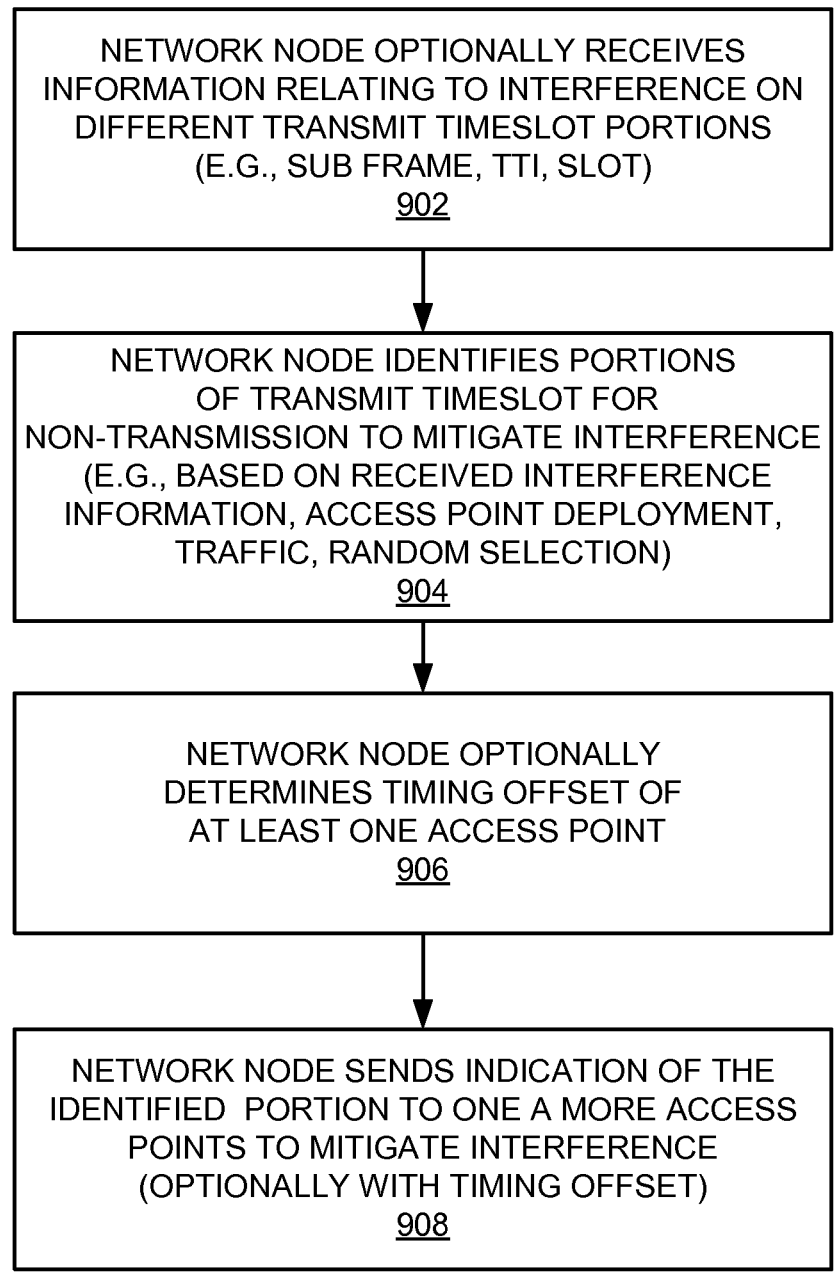
FIGS. 9 and 10 are flowcharts of several sample aspects of operations that may be performed to manage interference through the use of timeslot-based fractional reuse.
Figure 10:
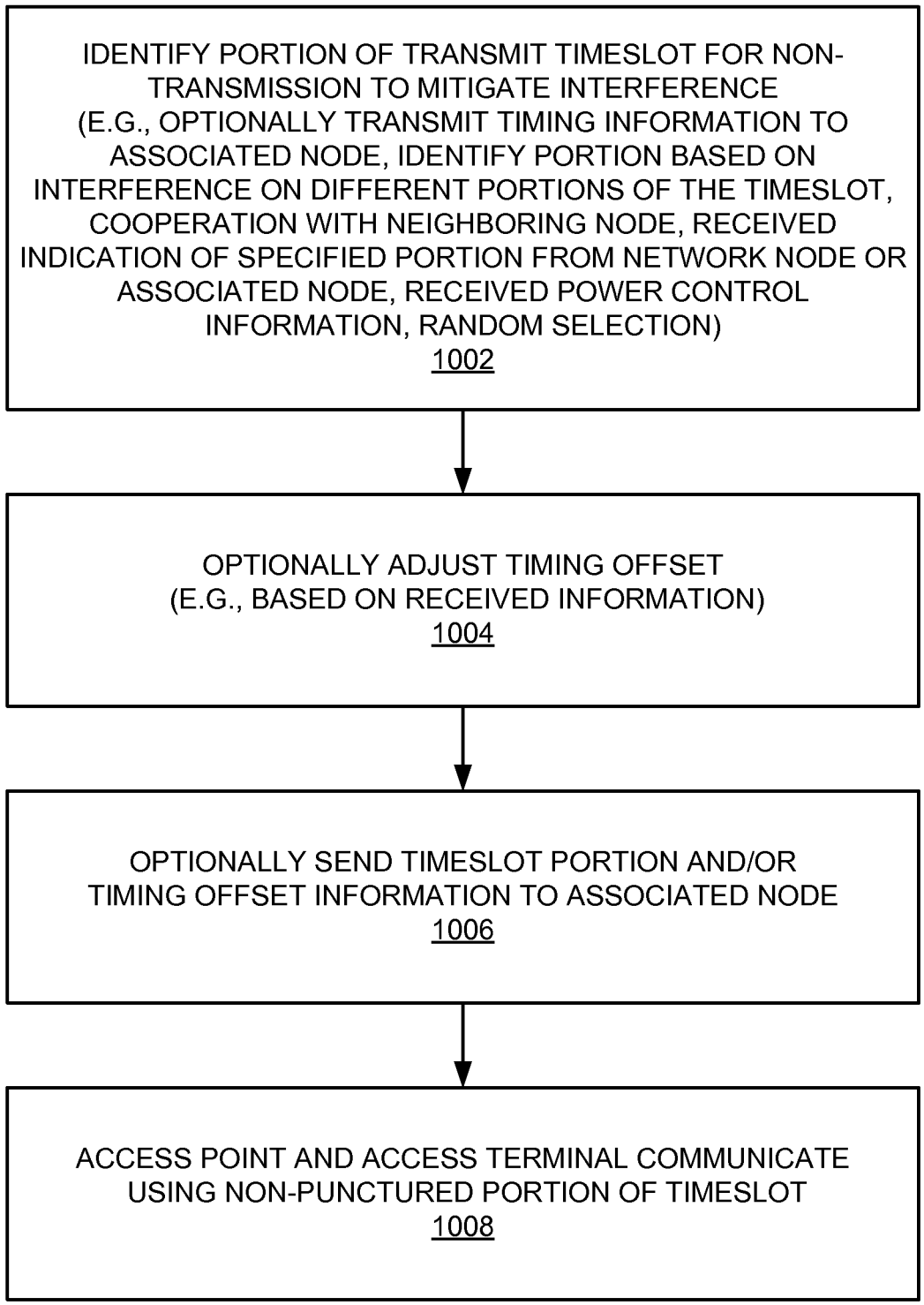

Referring now to FIGS. 9 and 10, operations relating to the use of a fractional reuse scheme employing selective transmission (e.g., puncturing) on an uplink or a downlink will be described in more detail. As mentioned above, a system may transmit during one or more defined timeslots which, in various implementations, may relate to or be referred to as a frame, a subframe, a slot, a transmission time interval ("TTI"), an HARQ interlace, and so on.

In some aspects, a fractional reuse scheme may involve configuring neighboring nodes (e.g., access points and/or access terminals) to refrain from transmitting during a portion of one or more transmit timeslots. For example, a first access point may transmit during a first portion (e.g., a part or the entirety of a subframe) of a timeslot while a second access point transmits during a second portion (e.g., another part of the subframe or the entirely of a different subframe) of a timeslot. As a result, interference that may otherwise occur between the nodes may be reduced.

In some aspects, a determination as to whether a node will refrain from transmitting during a given portion of a timeslot may involve determining how much interference is present on different portions of the timeslot. For example, a node may refrain from transmitting on those portions of a time slot that are associated with higher interference.

Referring initially to FIG. 9, as represented by block 902, the network node 114 (e.g., a timeslot control component 346 of the interference controller 320) or some other suitable entity may determine how a given transmit timeslot or a set of transmit timeslots is/are to be divided into portions so that different nodes may selectively refrain from transmitting during one or more of these timeslot portions. This may involve, for example, determining parameters such as the structure of each timeslot portion, the number of timeslot portions, the size of each timeslot portion, and the location of each timeslot portion. Here, it should be appreciated that a given timeslot portion may be defined to include subportions that are not contiguous in time or may be defined as a single contiguous period of time. In some cases, these timeslot parameters may be predefined for a system.

In some aspects the parameters of the timeslot portions are defined to mitigate interference in a system. To this end, the timeslot portions may be defined based on how nodes are deployed in the system (e.g., the total number of access points, the density of access points within a given area, the relative proximity of the access points, and so on). Here, if there are a large number of nodes deployed in a given area, more timeslot portions (e.g., and possibly smaller portions) may be defined and/or more separation may be provided between the timeslot portions. In this way, neighboring nodes may be less likely to use the same timeslot portion (or interference with a neighboring timeslot portion) and any potentially interfering nodes may thereby be configured to not transmit during a larger percentage of a timeslot or set of timeslots. Conversely, if there are a smaller number of nodes in the system fewer timeslot portions (e.g., and possibly larger portions with less separation) may be defined to improve communication performance (e.g., throughput).

The timeslot portions also may be defined based on the traffic (e.g., the amount of traffic, the types of traffic, the quality of service requirements of the traffic) handled by the access points. For example, some types of traffic may be more sensitive to interference than other types of traffic. In such a case, more timeslot portions may be defined and/or more separation may be provided between the timeslot portions. In addition, some types of traffic may have stricter throughput requirements (but less sensitivity to interference) whereby larger timeslot portions may be defined.

The timeslot portions also may be defined based on interference in the system. For example, if interference values are high in the system, more timeslot portions may be defined and/or more separation may be provided between the timeslot portions.

The operations of block 902 may therefore be based on interference-related feedback from one or more access points and/or access terminals in the system (e.g. as discussed above). For example, access terminal measurement reports and/or reports from access nodes may be used to determine the extent to which the nodes in the system may interfere with one another.

As represented by block 904, in some cases the network node 114 may specify specific timeslot portions to be used by specific nodes. In some cases the timeslot portions may be assigned in a random manner. Typically, however, the timeslot portions may be selected in an effort to mitigate interference between nodes in the system. In some aspects, a determination of which timeslot portion a given node should use may be similar to the operations of block 902 described above. For example, the network node 114 may determine the amount of interference that is associated with the timeslot portions.

For a downlink, an access point may first be configured to use a first timeslot portion. Interference associated with the use of that timeslot portion may then be determined (e.g., based on CQI reports collected over a period of time). The access point may then be configured to use a second timeslot portion. Interference associated with the use of the second timeslot portion may then be determined (e.g., based on CQI reports collected over a period of time). The network controller may then assign the timeslot portion associated with lowest interference to the access point.

For an uplink, an access terminal may be configured to initially use a first timeslot portion. Interference associated with the use of that timeslot portion may, for example, be determined indirectly based on the transmit power values (e.g., as automatically set by power control commands from an associated access point) used when transmitting on the uplink over a period of time. The access terminal may then be configured to use a second timeslot portion. Interference associated with the use of the second timeslot portion may then be determined (e.g., as discussed above). The network node 114 may then assign the timeslot portion associated with lowest interference (e.g., as indicated by the lowest uplink transmit power) to that access terminal and its associated access point.

The network node 114 also may designate timeslot portions for neighboring nodes in a manner that mitigates interference between the nodes. As a specific example, the network node 114 may determine that downlink transmission by the access point 106 may interfere with reception at an access terminal associated with the access point 104. This may be determined, for example, based on the downlink interference-related information that the network node 114 may acquire as discussed herein. To mitigate such potential interference, the network node 114 may assign different timeslot portions to the access points 104 and 106.

As represented by block 906, the network node 114 may determine a timing offset of one or more access points in order to synchronize the timeslot timing of the access points. Such synchronization may be achieved, for example, using an adjustment such as Tau-DPCH (where DPCH relates to a dedicated physical channel) or some other suitable synchronization scheme.

As represented by block 908, the network node 114 then sends the timeslot portion parameters it defined to one or more access points. For example, a network node 114 may send a node-specific designation to each access point or the network node 114 may send a common designation to all of the access points in a set of access points. The network node 114 also may send one or more timing offset indications to the access points for use in synchronization operations.

Referring now to FIG. 10, this flowchart describes operations that may be performed by an access point for downlink operations or an access terminal for uplink operations. Initially, the downlink case will be treated.

As represented by block 1002, the access point 104 (e.g., a timeslot control component 348 of the interference controller 322) determines the timeslot portion it will use for downlink communication. In the event the network node 114 designated the timeslot portion to be used by the access point 104, the access point 104 may simply use these timeslot portions. In some cases, the access point 104 may randomly select which timeslot portion to use.

If the timeslot portion was not designated by the network node 114 or selected randomly, the access point 104 may determine which timeslot portion to use based on appropriate criteria. In some aspects, the access point 104 may select the timeslot portion associated with the lowest interference. Here, the access point 104 may determine which timeslot portion to use in a similar manner as discussed above at block 904 (e.g., by using different portions over different periods of time and monitoring CQI or some other parameter during each period of time).

In some cases, the access point 104 may cooperate with one or more other access points to determine which timeslot portion to use. For example, the access point 104 and the access point 106 may negotiate to use different (e.g., mutually exclusive) timeslot portions.

As represented by block 1004, the access point 104 may determine a timing offset to use for downlink communication. For example, the access point 104 may continuously monitor a link over a period of time to determine approximately when a neighboring node commences and ends its transmissions. In this way, the access point 104 may determine (e.g., estimate) the timeslot portion timing of the neighboring node. The access point may then synchronize the timeslot timing portion of its downlink to that time. In some aspects this may be involve defining a Tau-DPCH parameter.

As represented by block 1006, the access point 104 may send a message (e.g., including timing offset information) to an associated access terminal to inform the access terminal which timeslot portions are to be used for the downlink. In this way, the access point 104 may schedule downlink transmissions on the best available timeslot portions (block 1008).

Turning now to the uplink scenario, as represented by block 1002, the access terminal 104 (e.g., the interference controller 324) determines the timeslot portions it will use for uplink communication. In the event the network node 114 designated the timeslot portions to be used by the access terminal 110 the access terminal 110 may simply use these timeslot portions. In some cases, the access terminal 110 may randomly select which timeslot portion to use.

If the timeslot portions were not designated by the network node 114 or selected randomly, the access terminal 110 may determine which timeslot portion to use based on appropriate criteria. In some aspects, the access terminal 110 may select the timeslot portion associated with the lowest interference (e.g., lowest transmit power). Here, the access terminal 110 may determine which timeslot portion to use in a similar manner as discussed above at block 904 or this may occur automatically due to the power control operations of the access point 104.

In some cases, the access point 104 may monitor uplink interference during a timeslot portion test (e.g., a test to determine which timeslot portion has the lowest interference). In such cases, the access point 104 may instruct the access terminal 110 to use certain timeslot portions during a given phase of the interference test. Alternatively, the access terminal 110 may tell the access point 104 which timeslot portions are being used for a given phase of the test.

In some cases, the access point 104 may cooperate with one or more other access points to determine which uplink timeslot portion to use. For example, the access point 104 and the access point 106 may negotiate to use different (e.g., mutually exclusive) timeslot portions. In such a case, the access point 104 may forward this information to the access terminal 110.

As represented by block 1004, the access terminal 110 may determine a timing offset to use for uplink or downlink communication. For example, the access terminal 110 may continuously monitor a link over a period of time to determine approximately when a neighboring node commences and ends its transmissions. In this way, the access terminal 110 may determine (e.g., estimate) the timeslot portion timing of the neighboring node. Alternatively, the access terminal 110 may receive timing offset information from the access point 104 (e.g., a Tau-DPCH parameter). In either case, the access terminal 110 may then synchronize the timeslot timing portion of its uplink to that time.

As represented by block 1006, the access terminal 110 may send a message to the access point 104 to inform the access point 104 which timeslot portions are to be used for the uplink. In this way, the access terminal 110 may schedule uplink data transmissions on the best available timeslot portions (block 1008).

The above operations may be performed on a repeated based in an attempt to continually provide the best timeslot portions for the nodes in the system. In some cases, a decision may be made to not transmit during certain pilot bit times to provide more accurate SNR estimate (e.g., for EV-DO). In some cases, a decision may be made to not transmit during certain overhead channels to provide better isolation (e.g., for HSPA). In addition, provisions may be made at access terminals to account for the lower signal measurements they may see from access points employing the above scheme.

Figure 11:
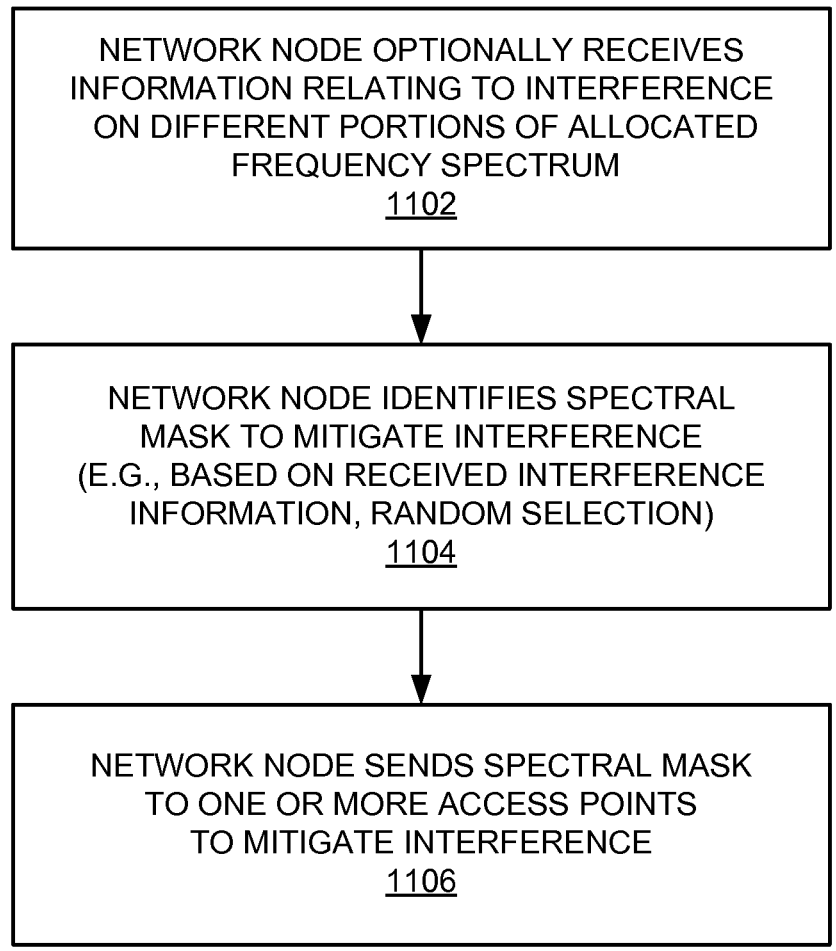
FIGS. 11 and 12 are flowcharts of several sample aspects of operations that may be performed to manage interference through the use of frequency spectrum-based fractional reuse.
Figure 12:
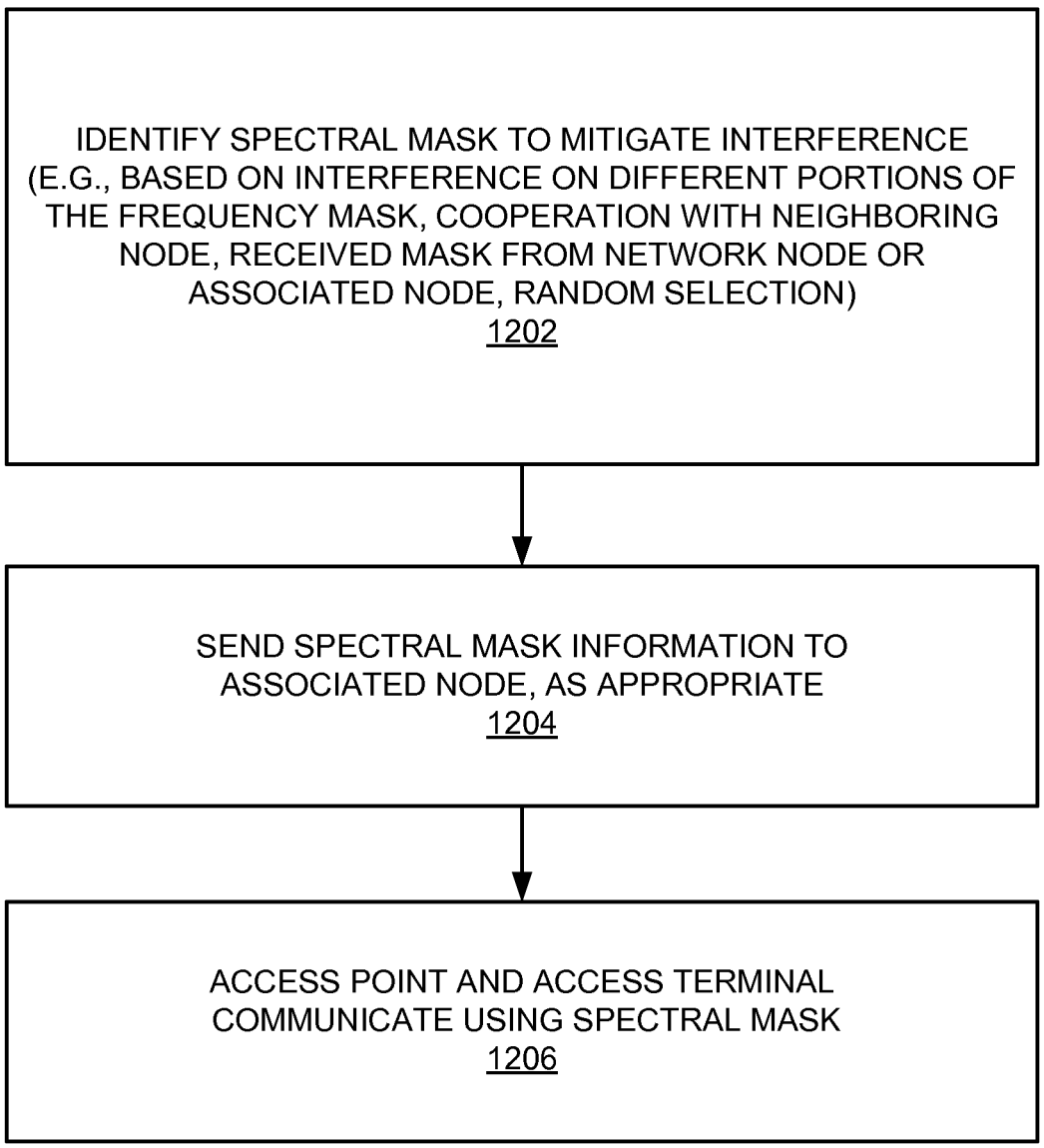

Referring now to FIGS. 11 and 12, operations relating to the use of a fractional reuse scheme employing spectral masks on an uplink or a downlink will be described in more detail. In some aspects, such a scheme may involve configuring neighboring nodes (e.g., access points and/or access terminals) to use different spectral masks when transmitting. Here, instead of utilizing all of the available frequency spectrum at constant power, each node may utilize a spectral mask to create a non-uniform power spectral density. For example, a first access point may transmit using a spectral mask associated with a first set of spectral components (e.g., a first subset of an allocated frequency spectrum) while a second access point transmits using another spectral mask associated with a second set of spectral components (e.g., a second subset of an allocated frequency spectrum). As a result, interference that may otherwise occur between the nodes may be reduced.

In some aspects, a determination as to whether a node will use a given spectral mask may involve determining how much interference is seen when different spectral masks are used. For example, a node may elect to use a spectral mask that is associated with lower interference. Here, it should be appreciated that a given spectral mask may be defined to include spectral components that are not contiguous in frequency or may be defined as a single contiguous range of frequencies. Also, a spectral mask may comprise a positive mask (e.g., defining frequency components to be used) or a negative mask (e.g., defining frequency components not to be used).

Referring initially to FIG. 11, as represented by block 1102, the network node 114 (e.g., a spectral mask control component 350 of the interference controller 320) may receive information that is indicative of the interference associated with different spectral components of a frequency spectrum allocated for uplink or downlink transmission.

The operations of block 1102 may therefore be based on interference-related feedback from one or more access points and/or access terminals in the system (e.g. as discussed above). For example, access terminal measurement reports and/or reports from access nodes may be used to determine the extent to which the nodes in the system may interfere with one another when a given spectral mask is used.

As represented by block 1104, in some cases the network node 114 may specify specific spectral masks to be used by specific nodes. In some cases the spectral masks may be assigned in a random manner. Typically, however, the spectral masks may be selected in an effort to more effectively mitigate interference between nodes in the system.

For example, for a downlink, an access point may first be configured to use a first spectral mask (e.g., a filter defined with certain spectral characteristics) when transmitting. This spectral mask may be restricted, for example, to substantially the first half of the allocated spectrum (e.g., the spectral mask has substantially full power spectral density for half of the spectrum and significantly reduced power spectral density for the other half of the spectrum). Interference associated with the use of that spectral mask may then be determined (e.g., based on CQI reports collected over a period of time). The access point may then be configured to use a second spectral mask (e.g., that is restricted to substantially the second half of the allocated spectrum). Interference associated with the use of the second spectral mask may then be determined (e.g., based on CQI reports collected over a period of time). The network node 114 may then assign the spectral mask associated with lowest interference to the access point.

For an uplink, an access terminal may first be configured to use a first spectral mask when transmitting. Interference associated with the use of that spectral mask may then be determined (e.g., based on uplink interference measured by an associated access terminal). The access terminal may then be configured to use a second spectral mask and interference associated with the use of the second spectral mask is determined. The network node 114 may then assign the spectral mask associated with lowest interference to the access terminal.

The network node 114 also may designate spectral masks for neighboring nodes in a manner that mitigates interference between the nodes. As a specific example, the network node 114 may determine that downlink transmission by the access point 106 may interfere with reception at an access terminal associated with the access point 104. This may be determined, for example, based on the downlink interference-related information that the network node 114 may acquire as discussed herein. To mitigate such potential interference, the network node 114 may assign different spectral masks to the access points 104 and 106.

As represented by block 1106, the network node 114 then sends the spectral masks it identified to the appropriate access point(s). Here, the network node 114 may send a node-specific message to each access point or the network node 114 may send a common message to all of the access points in a set of access points.

Referring now to FIG. 12, this flowchart describes operations that may be performed by an access point and an associated access terminal for uplink and downlink operations. As represented by block 1202, the access point 104 (e.g., a spectral mask control component 352 of the interference controller 322) determines the spectral mask that will be used for the uplink or the downlink. In the event the network node 114 designated the spectral mask to be used, the access point 104 may simply use the designated spectral mask. In some cases, the access point 104 may randomly select which spectral mask to use.

If the spectral mask was not designated by the network node 114 or selected randomly, the access point 104 may determine which spectral mask to use based on appropriate criteria. In some aspects, the access point 104 may select the spectral mask associated with the lowest interference. For example, the access point 104 may determine which spectral mask to use in a similar manner as discussed above at blocks 1102 and 1104 (e.g., through the use of different spectral masks over different periods of time and monitoring CQI or some other interference-related parameter during each period of time).

In some cases, the access point 104 may cooperate with one or more other access points to determine which spectral mask to use. For example, the access point 104 and the access point 106 may negotiate to use different (e.g., mutually exclusive) spectral masks.

As represented by block 1204, the access point 104 sends a message to the access terminal 110 to inform the access terminal 110 which spectral mask is to be used for the uplink (or, optionally, the downlink). In this way, the access point 104 may transmit on the downlink using the best available spectrum and/or the access terminal 110 may transmit on the uplink using the best available spectrum (block 1206). Here, an equalizer at the receiving node (e.g., the access terminal for the downlink) may mitigate the effect of the spectral mask (especially if there is no loading from a neighboring cell). In addition, in come cases, the equalizer may be adaptive and take into account the specific spectral mask employed at the transmitting node (e.g., the access point for the downlink).

The above operations may be performed on a repeated based in an attempt to continually provide the best spectral masks for the nodes in the system.

Figure 13:
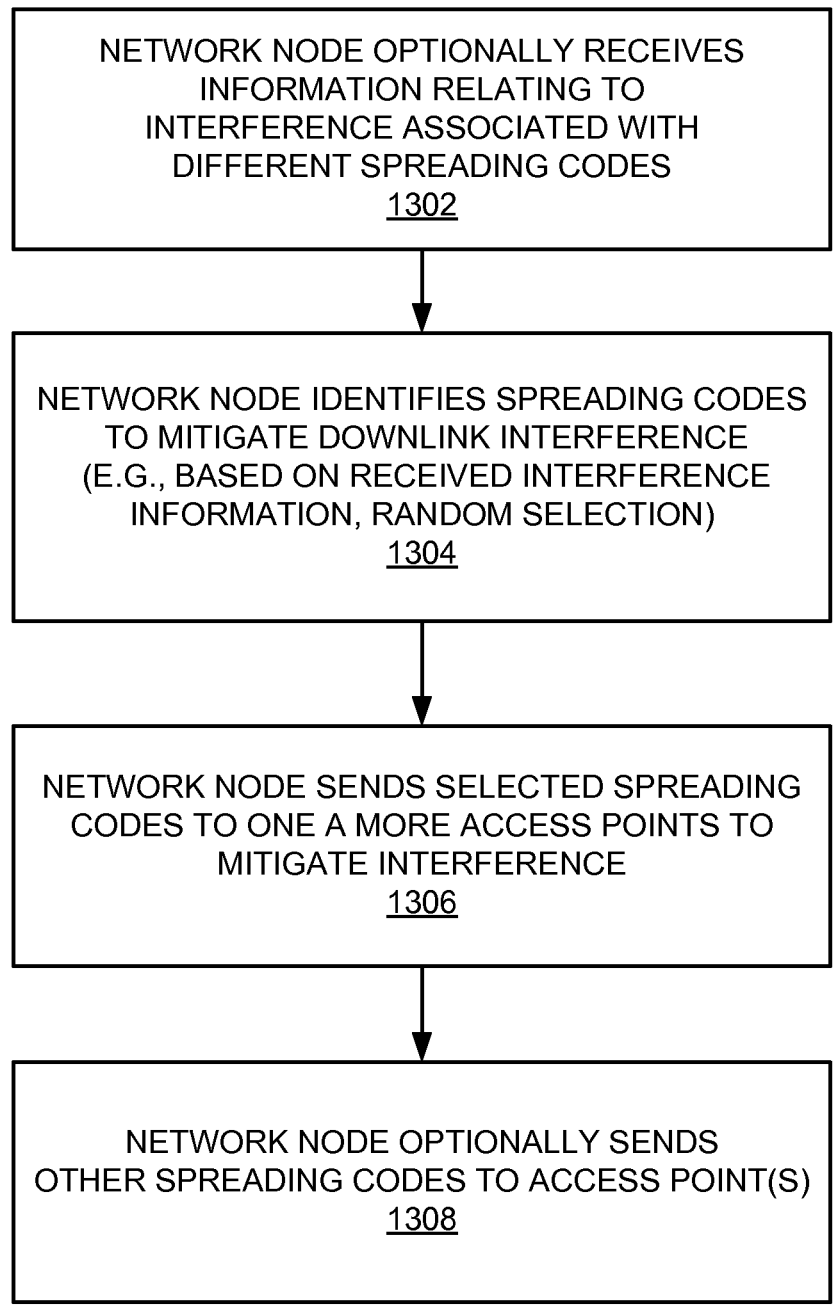
FIGS. 13 and 14 are flowcharts of several sample aspects of operations that may be performed to manage interference through the use of spreading code-based fractional reuse.
Figure 14:
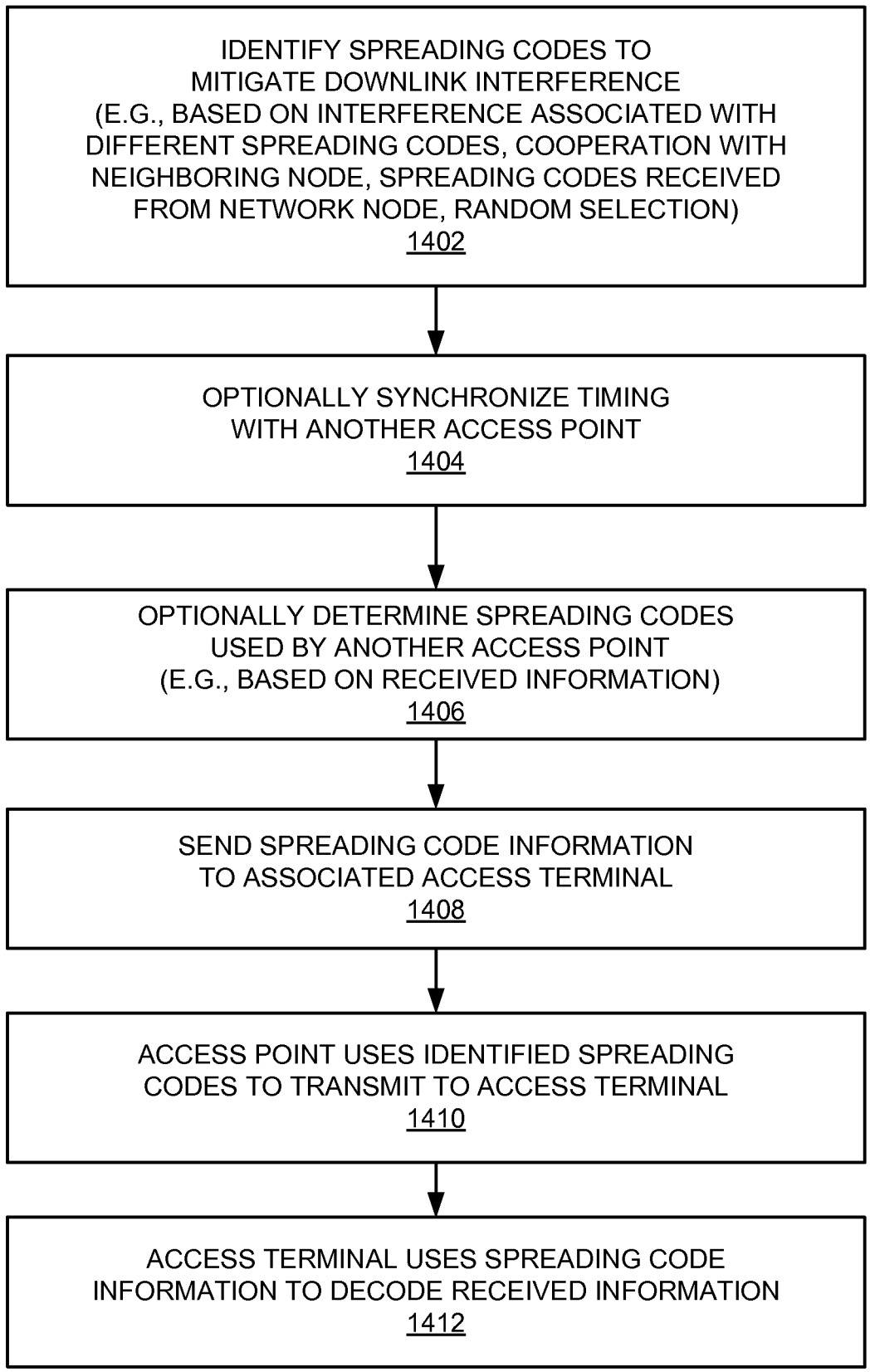

Referring now to FIGS. 13 and 14, operations relating to the use of a fractional reuse scheme employing spreading codes (e.g., Walsh codes or OVSF codes) are described. In some aspects, such a scheme may involve configuring neighboring nodes (e.g., access points) to use different spreading codes when transmitting. Here, instead of utilizing all of the codes in an allocated set of spreading codes, each node may utilize a subset of the spreading codes. For example, a first access point may transmit using a first set of spreading codes while a second access point transmits using a second set of spreading codes. As a result, interference that may otherwise occur between the nodes may be reduced.

In some aspects, a determination as to whether a node will use a given spreading code may involve determining how much interference is seen when different spreading codes are used. For example, a node may elect to use a spreading code that is associated with lower interference.

Referring initially to FIG. 13, as represented by block 1302, the network node 114 (e.g., a spreading code control component 354 of the interference controller 320) may receive information that is indicative of the interference associated with different spreading codes subsets of a set of spreading codes allocated for downlink transmission.

The operations of block 1302 may therefore be based on interference-related feedback from one or more access points and/or access terminals in the system (e.g., as discussed above). For example, access terminal measurement reports and/or reports from access nodes may be used to determine the extent to which the nodes in the system may interfere with one another when a given spreading code is used.

As represented by block 1304, in some cases the network node 114 may specify specific spreading codes to be used by specific nodes. In some cases the spreading codes may be assigned in a random manner. Typically, however, the spreading codes may be selected in an effort to more effectively mitigate interference between nodes in the system.

For example, an access point may first be configured to use a first set of spreading codes when transmitting on a downlink. Interference associated with the use of that set of spreading codes may then be determined (e.g., based on CQI reports collected over a period of time). The access point may then be configured to use a second set of spreading codes and interference associated with the use of the second set of spreading codes is determined. The network node 114 may then assign the spreading code associated with lowest interference to the access point.

The network node 114 also may designate spreading codes for neighboring nodes in a manner that mitigates interference between the nodes. As a specific example, the network node 114 may determine that downlink transmission by the access point 104 may interfere with reception at an access terminal associated with the access point 106. This may be determined, for example, based on the downlink interference-related information that the network node 114 may acquire as discussed herein. To mitigate such potential interference, the network node 114 may assign different spreading codes to the access points 104 and 106.

As represented by block 1306, the network node 114 then sends the spreading codes it identified to the appropriate access point(s). Here, the network node 114 may send a node-specific message to each access point or the network node 114 may send a common message to all of the access points in a set of access points.

As represented by block 1308, the network node 114 also may send one or more other sets of spreading codes to the access point(s). As will be discussed in more detail below, these sets may identify the spreading codes that are not being used by a given access point and/or the spreading codes that are being used by some other access point.

Referring now to FIG. 14, as represented by block 1402, the access point 104 (e.g., a spreading code control component 356 of the interference controller 322) determines the set of spreading codes that will be used for the downlink. In the event the network node 114 designated the set to be used, the access point 104 may simply use the designated set. In some cases, the access point 104 may randomly select which set of spreading codes to use.

If the set of spreading codes was not designated by the network node 114 or selected randomly, the access point 104 may determine which set to use based on appropriate criteria. In some aspects, the access point 104 may select the set of spreading codes associated with the lowest interference. For example, the access point 104 may determine which set to use in a similar manner as discussed above at blocks 1302 and 1304 (e.g., through the use of different spreading codes over different periods of time and monitoring CQI or some other interference-related parameter during each period of time).

In some cases, the access point 104 may cooperate with one or more other access points to determine which set of spreading codes to use. For example, the access point 104 and the access point 106 may negotiate to use different (e.g., mutually exclusive) set of spreading codes.

As represented by block 1404, the access point 104 may optionally synchronize its timing the timing of one or more other access points. For example, by achieving chip alignment with neighboring cells (e.g., associated with other restricted access points), orthogonal channels may be established between the access points through the use of different spreading codes at each access point. Such synchronization may be accomplished, for example, using techniques as described above (e.g., the access points may include GPS functionality).

As represented by block 1406, the access point 104 may optionally determine the spreading codes that are used by one or more other access points. Such information be acquired, for example, from the network node 114 or directly from the other access nodes (e.g., via the backhaul).

As represented by block 1408, the access point 104 sends a message to the access terminal 110 to inform the access terminal 110 which spreading code is to be used for the downlink. In addition, the access point 104 may send information to the access terminal 110 that identifies the spreading codes that are not being used by the access point 104 and/or that identifies the spreading codes that are being used by some other access point (e.g., a neighboring access point).

As represented by block 1410, the access point 104 transmits on the downlink using the selected set of spreading codes. In addition, as represented by block 1412, the access terminal 110 uses the spreading code information sent by the access point 104 to decode the information it receives via the downlink.

In some implementations, the access terminal 110 may be configured to utilize the information regarding the spreading codes not used by the access point 104 to more efficiently decode the received information. For example, a signal processor 366 (e.g., comprising interference cancellation capabilities) may use these other spreading codes in an attempt to cancel, from the received information, any interference created by signals received from another node (e.g., the access point 106) that were encoded using these other spreading codes. Here, the original received information is operated on using the other spreading codes to provide decoded bits. A signal is then generated from the decoded bits and this signal is subtracted from the original received information. The resulting signal is then operated on using the spreading codes sent by the access point 104 to provide an output signal. Advantageously, through the use of such interference control techniques, relatively high levels of interference rejection may be achieved even when the access point 104 and the access terminal 110 are not time synchronized.

The above operations may be performed on a repeated based in an attempt to continually provide the best spreading codes for the nodes in the system.

Figure 15:
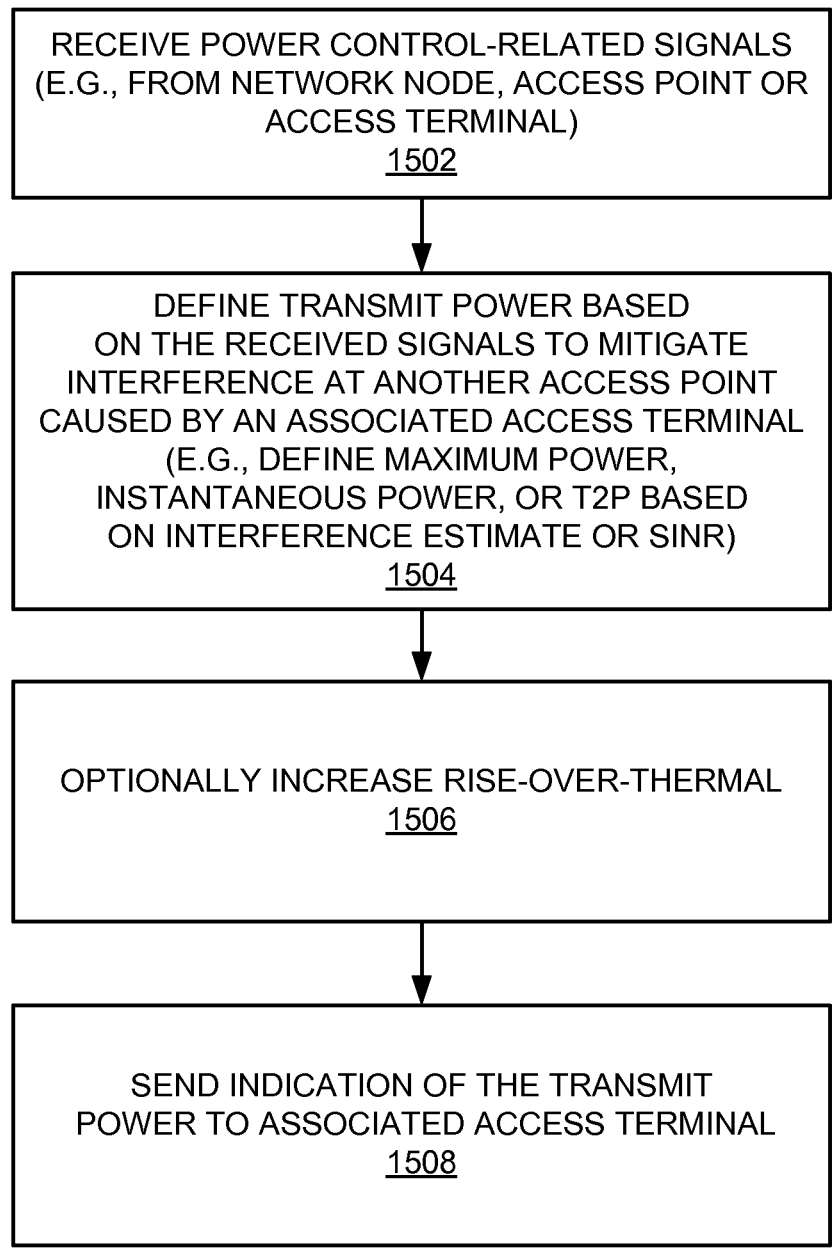
FIG. 15 is a flowchart of several sample aspects of operations that may be performed to manage interference through the use of transmit power control.
Figure 16:
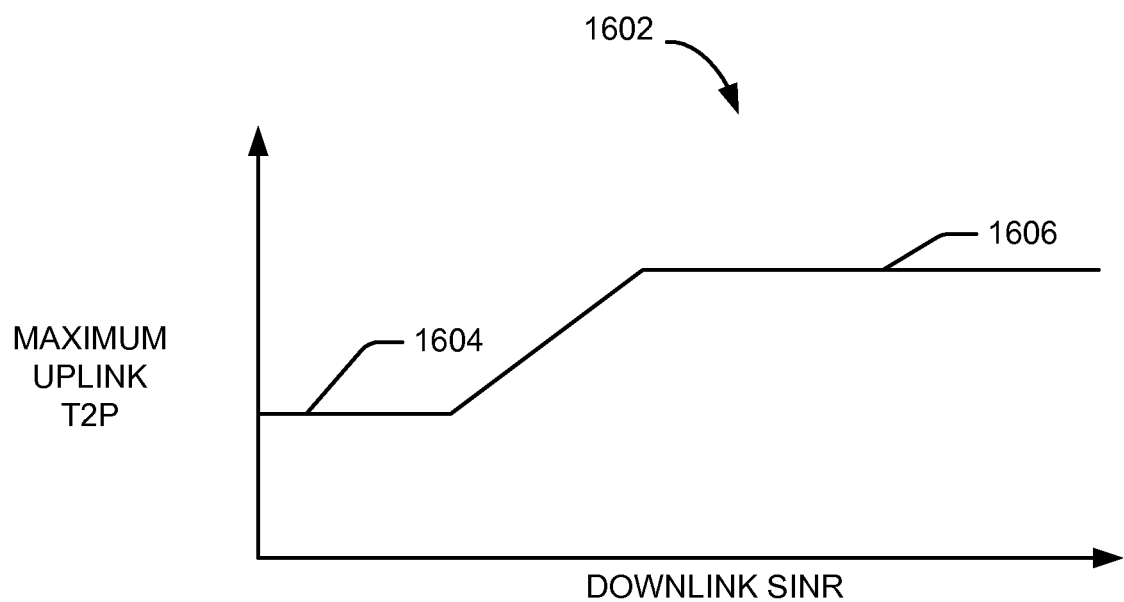
FIG. 16 is a simplified diagram illustrating several aspects of a sample power control function.

Referring now to FIGS. 15 and 16, operations relating to the use of a power control-related scheme for mitigating interference will be described. In particular, these operations relate to controlling the transmit power of an access terminal to mitigate any interference the access terminal may cause on the uplink at a non-associated access point (e.g., that is operating on the same carrier frequency of an adjacent carrier frequency).

As represented by block 1502, a node (e.g., the network node 114 or the access point 104) receives power control-related signals that may be used to determine how to control the uplink transmit power of the access terminal 110. In various scenarios, the signals may be received from the network node 114, the access point 104, another access point (e.g., access point 106), or an associated access terminal (e.g., access points 110). Such information may be received in various ways (e.g., over a backhaul, over-the-air, etc.).

In some aspects, these received signals may provide an indication of interference at a neighboring access point (e.g., access point 106). For example, as discussed herein the access terminals associated with the access point 104 may generate measurement reports and send in these reports to the network node 114 via the access point 104.

In addition, access points in the system may generate a load indication (e.g., a busy bit or a relative grant channel) and send this information to its associated access terminal via a downlink. Thus, the access point 104 may monitor the downlink to acquire this information or the access point 104 may acquire this information from its associated access terminals that may receive this information over the downlink.

In some cases interference information may be received from the network node 114 or the access point 106 via the backhaul. For example, the access point 106 may report its loading (e.g., interference) information to the network node 114. The network node 114 may then distribute this information to other access points in the system. In addition, the access points in the system may communicate directly with one another to inform each other of their respective loading conditions.

As represented by block 1504, a transmit power indication for the access terminal 110 is defined based on the above parameters. This indication may relate to, for example, a maximum allowed power value, an instantaneous power value, or a traffic-to-pilot (T2P) indication.

In some aspects, a maximum transmit power value for the access terminal 110 is defined by estimating the interference the access terminal 110 may induce at the access point 106. This interference may be estimated, for example, based on path loss information derived from the measurement reports received from the access terminal 110. For example, the access terminal 110 may determine the path loss to the access point 106 in the path loss to the access point 104. Based on this information, the access point 104 may determine the power being induced (e.g., the amount of interference) at the access point 106 based on the signal strength of the signals the access point 104 receives from the access terminal 110. The access point 104 may thus determine the maximum allowed transmit power for access terminal 110 based on the above measurements (e.g., the maximum transmit power may be reduced by a certain amount).

In some aspects, an instantaneous power value may be generated to control the current transmit power of the access terminal. For example, in the event the amount of induced interference is greater than or equal to a threshold value, the access terminal 110 may be instruct to reduce its transmit power (e.g., by a specific amount or to a specified value).

In some cases, a power control operation may be based on one or more parameters. For example, if the access point 104 receives a busy bit from the access point 106, the access point 104 may utilize information from the measurement reports to determine whether the interference at the access point 106 is being caused by the access terminal 110.

Referring now to FIG. 16, in some implementations the transmit power indication generate a block 1504 may relate to maximum uplink T2P. Moreover, in some cases this value may be defined as a function of the downlink SINR. The waveform 1602 of FIG. 16 illustrates one example of a function that relates downlink SINR to uplink T2P. In this case, the uplink T2P application may be decreased as the downlink SINR decreases. In this way, uplink interference from access terminals in link unbalanced may be limited. As shown in example of FIG. 16, a minimum T2P value 1604 may be defined for the access terminal such that a certain amount of minimum weight is guaranteed. In addition, a maximum T2P value 1606 may be defined. In some aspects, the uplink T2P allocated to each access terminal may be limited by the minimum of the access terminal's power headroom or a function based on downlink SINR (e.g., as shown in FIG. 16). In some implementations (e.g., 3GPP), the above functionality may be provided by the uplink scheduler an access point that has access to CQI feedback from an access terminal.

Referring again to FIG. 15, as represented by block 1506, in some implementations the rise-over-thermal ("RoT") threshold for an access point may be allowed to increase above a conventional value for load control purposes. For example, in some cases no limit may be placed on the RoT threshold. In some cases, the RoT threshold may be allowed to rise to a value limited only by the uplink link budget or a saturation level at the access point. For example, an upper threshold RoT may be increased in the access point 104 to a predetermined value to enable each associated access terminal to operate at the highest T2P level allowed by its power headroom.

By allowing such an increase in the RoT threshold, the access point may control its total received signal strength. This may prove advantageous under situations where the access point is experiencing high level of interference (e.g., from nearby access terminal). In the absence of an RoT threshold limit, however, the access terminals in neighboring cells may get into a power race to overcome the interference from one another. For example, these access terminals may saturate at their maximum uplink transmit power (e.g., 23 dBm) and, as a result, may cause significant interference at macro access points. To prevent such a race condition, the transmit power of the access terminal may be reduced as a result of an increase in the RoT threshold. In some cases, such a race condition may be avoided through the use of a maximum uplink T2P control scheme (e.g., as described above in conjunction with FIG. 16).

As represented by block 1508, an indication of a transmit power value (e.g., maximum power, an instantaneous power, or T2P) as calculated using one or more of the techniques described above may be sent to the access terminal 110 to control the transmit power of the access terminal 110. Such a message may be sent directly or indirectly. As an example of the former case, explicit signaling may be used to inform the access terminal 110 of the new maximum power value. As an example of the latter case, the access point 104 may adjust T2P or may forward a load indication from the access point 106 (possibly after some modification) to the access terminal 110. The access terminal 110 may then use this parameter to determine the maximum power value.

Figure 17:
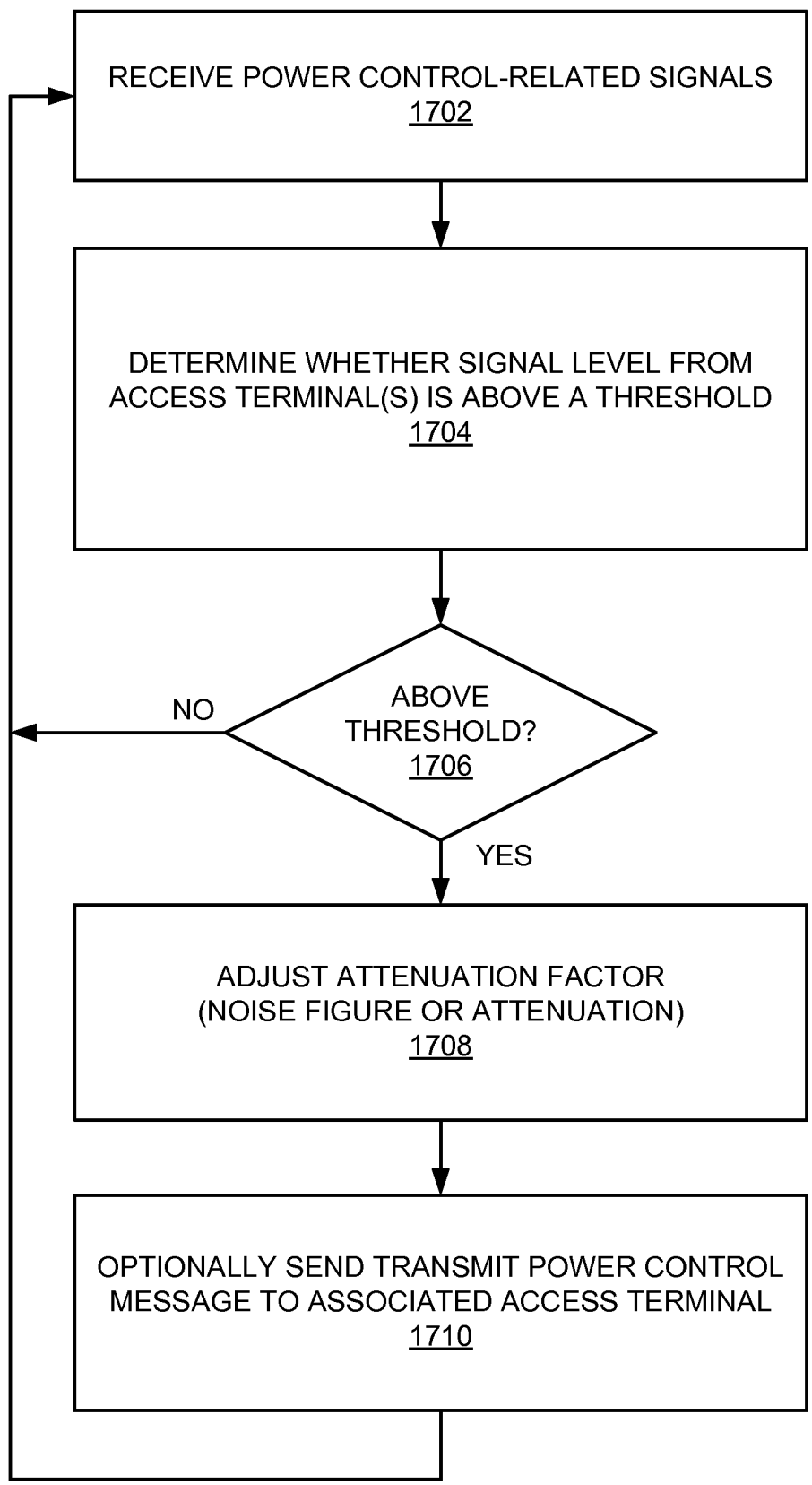
FIG. 17 is a flowchart of several sample aspects of operations that may be performed to manage interference by dynamically adjusting an attenuation factor.

Referring now to FIG. 17, in some implementations a signal attenuation factor may be adjusted to mitigate interference. Such a parameter may comprise a noise figure or attenuation. The amount of such padding or signal attenuation may be dynamically adjusted based on signal strength measured from other nodes (e.g., as discussed herein) or certain signaling messages (e.g., indicative of interference) exchanged between access points. In this way, the access point 104 may compensate for interference induced by nearby access terminals.

As represented by block 1702, the access terminal 104 may receive power control-related signals (e.g., as discussed above). As represented by blocks 1704 and 1706, the access point 104 may determine whether the received signal strength from an associated access terminal or a non-associated access terminal is greater than or equal to a threshold level. If not, the access point 104 continues monitoring power control related-signals. If so, the access point 104 adjusts the attenuation factor at blocks 1708. For example, in response to an increase in received signal strength, the access point 104 may increase its noise figure or receiver attenuation. As represented by block 1710, the access point 104 may send a transmit power control message to its associated access terminals to increase their uplink transmit power as a result of the increase in the attenuation factor (e.g., to overcome the noise figure or the uplink attenuation placed on the access point 104).

In some aspects, the access point 104 may distinguish the signals received from non-associated access terminals from the signals received from associated access terminals. In this way, the access terminal 104 may make an appropriate adjustment to the transmit power of its associated access terminals. For example, different adjustments may be made in response to signals from associated versus non-associated access terminals (e.g., depending on whether there is only one associated access terminal).

In another embodiment, interference cancellation may be performed by an access point for the access terminals that are not served by the access point or for the access terminals that are not in the active set of access points. For this purpose scrambling codes (in WCDMA or HSPA) or user long codes (in 1×EV-DO) may be shared among all the access points (that receive the scrambling codes from all the access terminals). Subsequently, the access point decodes the respective access terminal information and removes the interference associated with the respective access terminals.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 18:
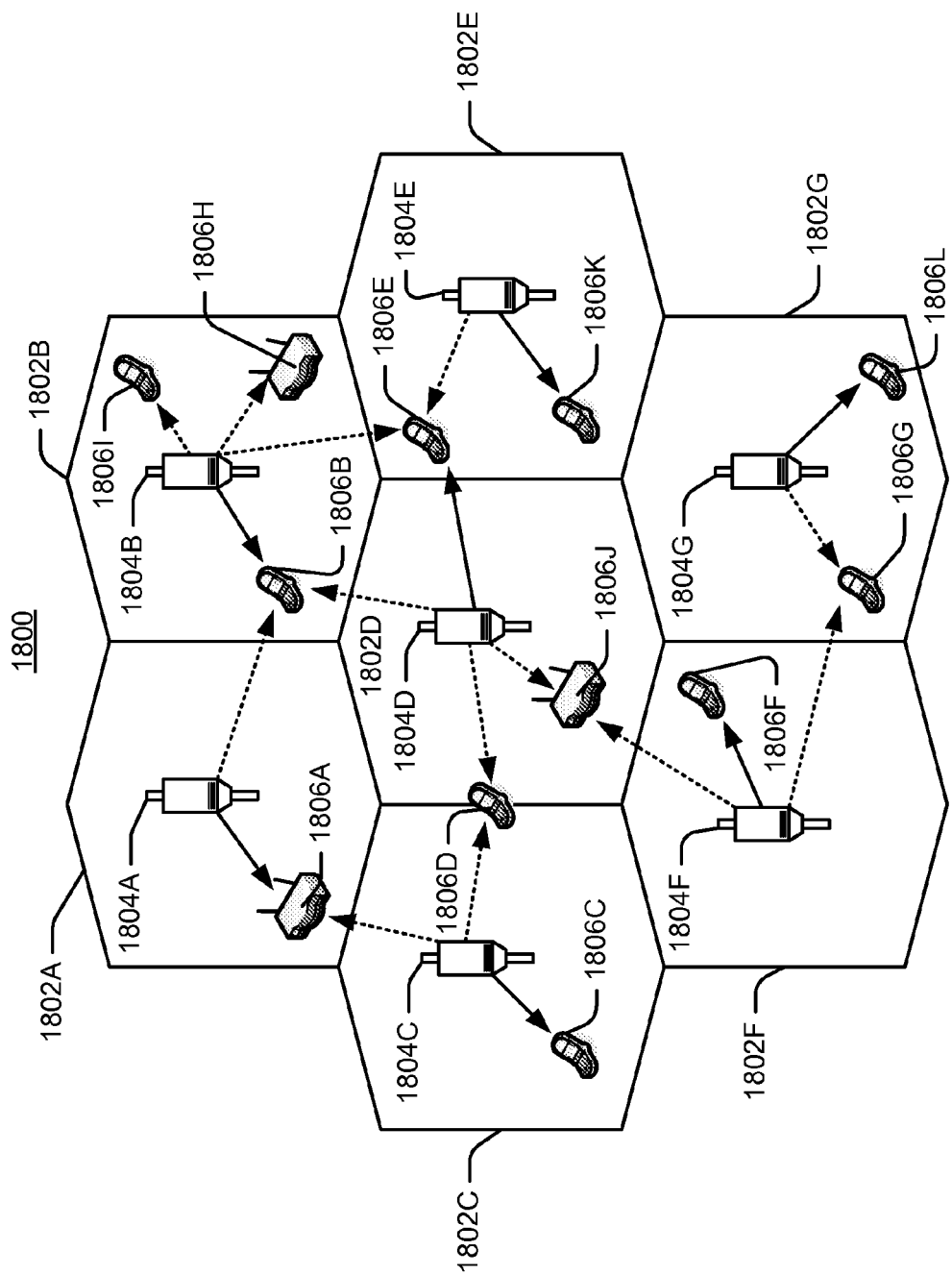
FIG. 18 is a simplified diagram of a wireless communication system.

FIG. 18 illustrates a wireless communication system 1800, configured to support a number of users, in which the teachings herein may be implemented. The system 1800 provides communication for multiple cells 1802, such as, for example, macro cells 1802A-1802G, with each cell being serviced by a corresponding access node 1804 (e.g., access nodes 1804A-1804G). As shown in FIG. 18, access terminals 1806 (e.g., access terminals 1806A-1806L) may be dispersed at various locations throughout the system over time. Each access terminal 1806 may communicate with one or more access nodes 1804 on a forward link ("FL") and/or a reverse link ("RL) at a given moment, depending upon whether the access terminal 1806 is active and whether it is in soft handoff, for example. The wireless communication system 1800 may provide service over a large geographic region. For example, macro cells 1802A-1802G may cover a few blocks in a neighborhood.

Figure 19:
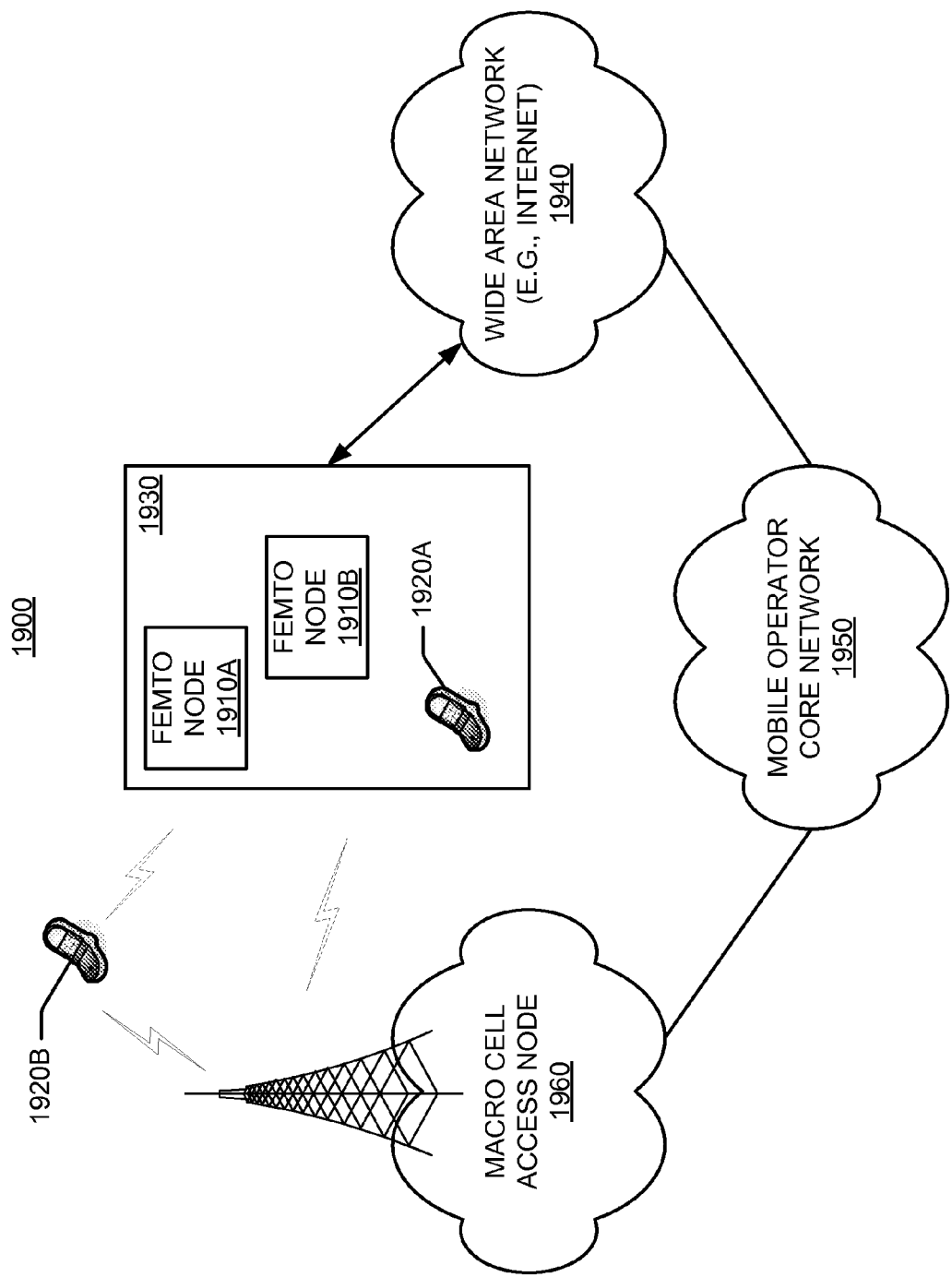
FIG. 19 is a simplified diagram of a wireless communication system including femto nodes.

FIG. 19 illustrates an exemplary communication system 1900 where one or more femto nodes are deployed within a network environment. Specifically, the system 1900 includes multiple femto nodes 1910 (e.g., femto nodes 1910A and 1910B) installed in a relatively small scale network environment (e.g., in one or more user residences 1930). Each femto node 1910 may be coupled to a wide area network 1940 (e.g., the Internet) and a mobile operator core network 1950 via a DSL router, a cable modem, a wireless link, or other connectivity means (not shown). As will be discussed below, each femto node 1910 may be configured to serve associated access terminals 1920 (e.g., access terminal 1920A) and, optionally, alien access terminals 1920 (e.g., access terminal 1920B). In other words, access to femto nodes 1910 may be restricted whereby a given access terminal 1920 may be served by a set of designated (e.g., home) femto node(s) 1910 but may not be served by any non-designated femto nodes 1910 (e.g., a neighbor's femto node 1910).

Figure 20:
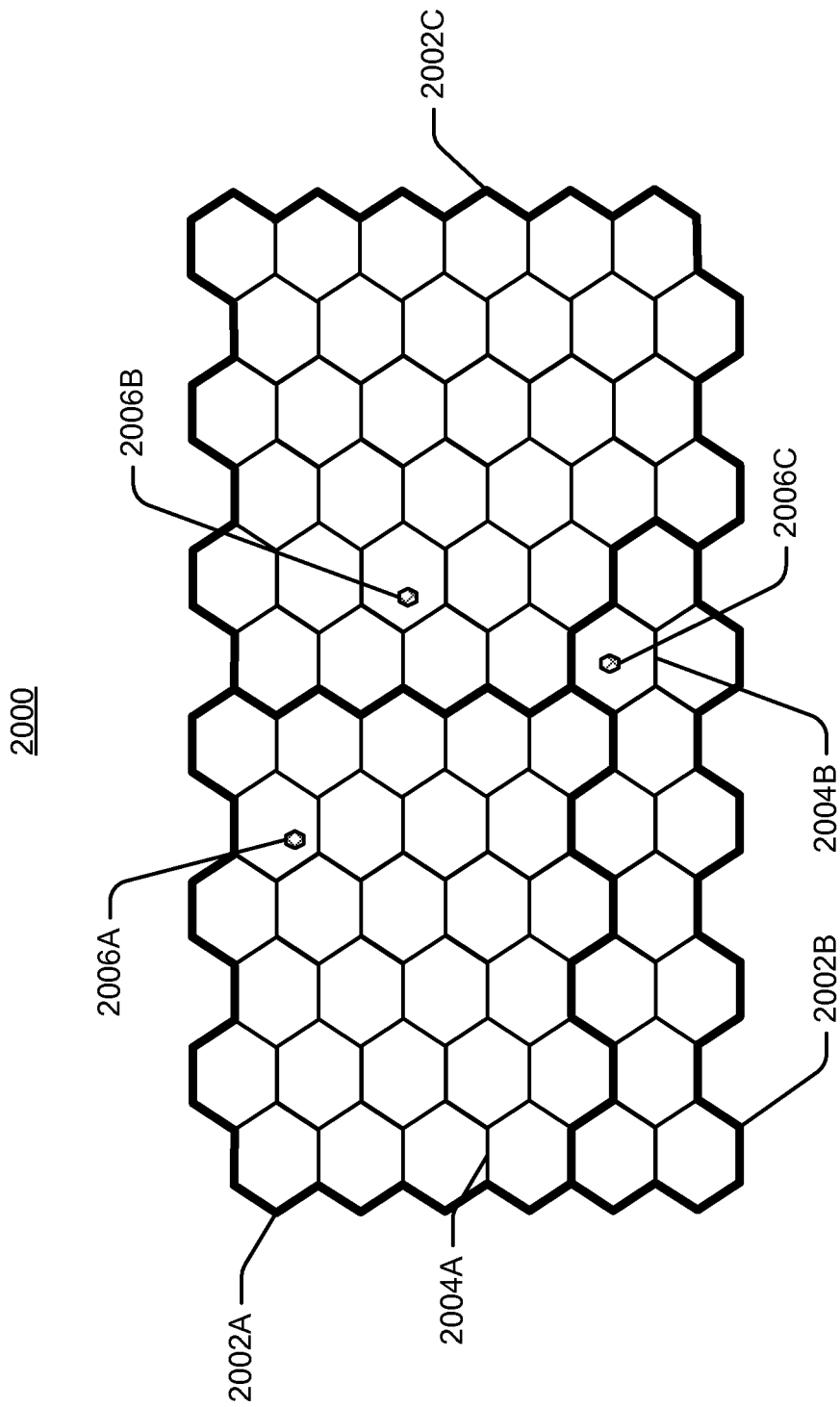
FIG. 20 is a simplified diagram illustrating coverage areas for wireless communication.

FIG. 20 illustrates an example of a coverage map 2000 where several tracking areas 2002 (or routing areas or location areas) are defined, each of which includes several macro coverage areas 2004. Here, areas of coverage associated with tracking areas 2002A, 2002B, and 2002C are delineated by the wide lines and the macro coverage areas 2004 are represented by the hexagons. The tracking areas 2002 also include femto coverage areas 2006. In this example, each of the femto coverage areas 2006 (e.g., femto coverage area 2006C) is depicted within a macro coverage area 2004 (e.g., macro coverage area 2004B). It should be appreciated, however, that a femto coverage area 2006 may not lie entirely within a macro coverage area 2004. In practice, a large number of femto coverage areas 2006 may be defined with a given tracking area 2002 or macro coverage area 2004. Also, one or more pico coverage areas (not shown) may be defined within a given tracking area 2002 or macro coverage area 2004.

Referring again to FIG. 19, the owner of a femto node 1910 may subscribe to mobile service, such as, for example, 3G mobile service, offered through the mobile operator core network 1950. In addition, an access terminal 1920 may be capable of operating both in macro environments and in smaller scale (e.g., residential) network environments. In other words, depending on the current location of the access terminal 1920, the access terminal 1920 may be served by an access node 1960 of the macro cell mobile network 1950 or by any one of a set of femto nodes 1910 (e.g., the femto nodes 1910A and 1910B that reside within a corresponding user residence 1930). For example, when a subscriber is outside his home, he is served by a standard macro access node (e.g., node 1960) and when the subscriber is at home, he is served by a femto node (e.g., node 1910A). Here, it should be appreciated that a femto node 1920 may be backward compatible with existing access terminals 1920.

A femto node 1910 may be deployed on a single frequency or, in the alternative, on multiple frequencies. Depending on the particular configuration, the single frequency or one or more of the multiple frequencies may overlap with one or more frequencies used by a macro node (e.g., node 1960).

In some aspects, an access terminal 1920 may be configured to connect to a preferred femto node (e.g., the home femto node of the access terminal 1920) whenever such connectivity is possible. For example, whenever the access terminal 1920 is within the user's residence 1930, it may be desired that the access terminal 1920 communicate only with the home femto node 1910.

In some aspects, if the access terminal 1920 operates within the macro cellular network 1950 but is not residing on its most preferred network (e.g., as defined in a preferred roaming list), the access terminal 1920 may continue to search for the most preferred network (e.g., the preferred femto node 1910) using a Better System Reselection ("BSR"), which may involve a periodic scanning of available systems to determine whether better systems are currently available, and subsequent efforts to associate with such preferred systems. With the acquisition entry, the access terminal 1920 may limit the search for specific band and channel. For example, the search for the most preferred system may be repeated periodically. Upon discovery of a preferred femto node 1910, the access terminal 1920 selects the femto node 1910 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1910 that reside within the corresponding user residence 1930). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 21:
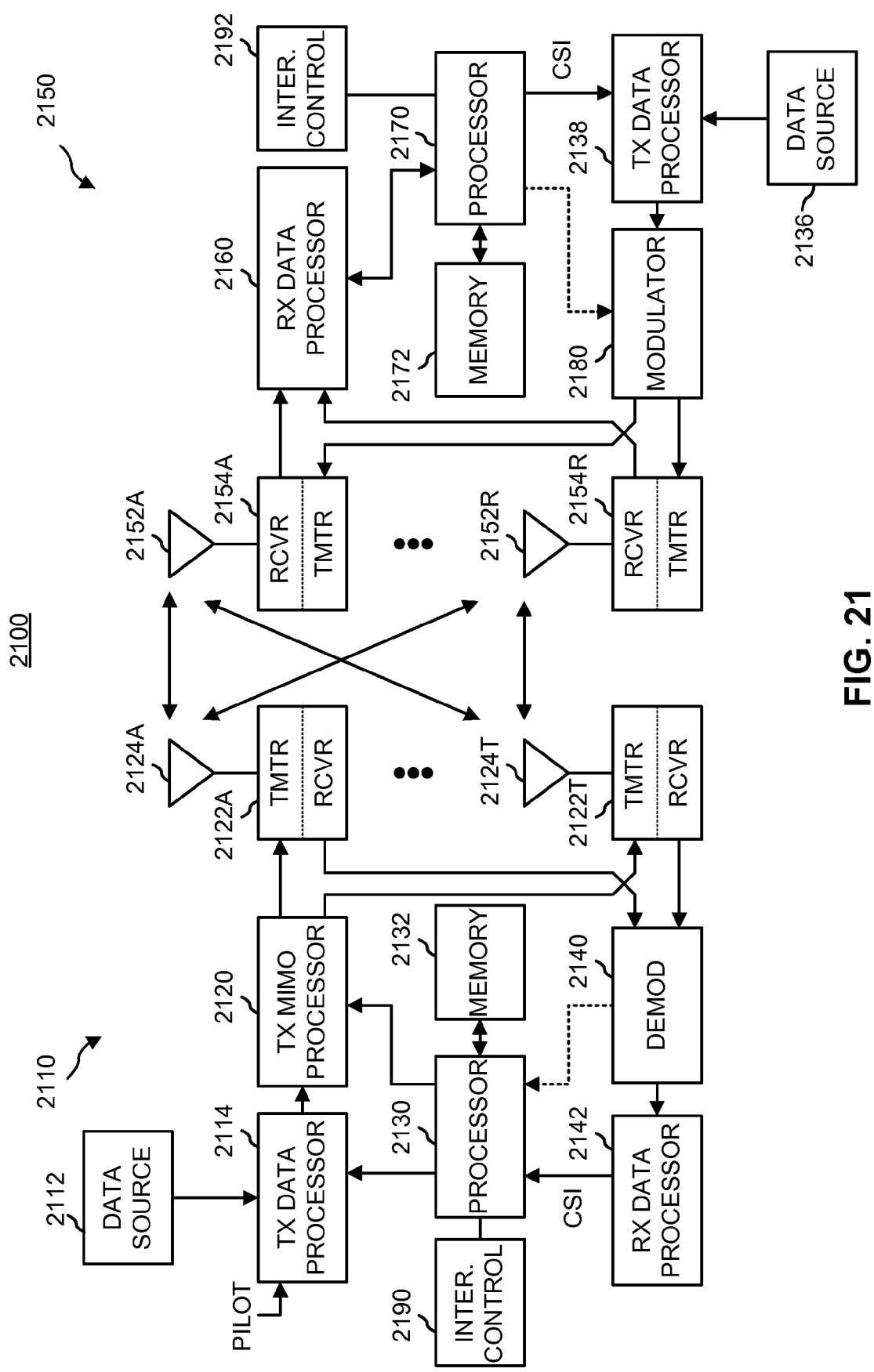
FIG. 21 is a simplified block diagram of several sample aspects of communication components.

The teachings herein may be incorporated into a node (e.g., a device) employing various components for communicating with at least one other node. FIG. 21 depicts several sample components that may be employed to facilitate communication between nodes. Specifically, FIG. 21 illustrates a wireless device 2110 (e.g., an access point) and a wireless device 2150 (e.g., an access terminal) of a MIMO system 2100. At the device 2110, traffic data for a number of data streams is provided from a data source 2112 to a transmit ("TX") data processor 2114.

In some aspects, each data stream is transmitted over a respective transmit antenna. The TX data processor 2114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2130. A data memory 2132 may store program code, data, and other information used by the processor 2130 or other components of the device 2110.

The modulation symbols for all data streams are then provided to a TX MIMO processor 2120, which may further process the modulation symbols (e.g., for OFDM). The TX MIMO processor 2120 then provides $N_T$ modulation symbol streams to $N_T$ transceivers ("XCVR") 2122A through 2122T. In some aspects, the TX MIMO processor 2120 applies beam-forming weights to the symbols of the data streams and to the antenna from which the symbol is being transmitted.

Each transceiver 2122 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2122A through 2122T are then transmitted from $N_T$ antennas 2124A through 2124T, respectively.

At the device 2150, the transmitted modulated signals are received by $N_R$ antennas 2152A through 2152R and the received signal from each antenna 2152 is provided to a respective transceiver ("XCVR") 2154A through 2154R. Each transceiver 2154 conditions (e.g., filters, amplifies, and downconverts) a respective received signal, digitizes the conditioned signal to provide samples, and further processes the samples to provide a corresponding "received" symbol stream.

A receive ("RX") data processor 2160 then receives and processes the $N_R$ received symbol streams from $N_R$ transceivers 2154 based on a particular receiver processing technique to provide $N_T$ "detected" symbol streams. The RX data processor 2160 then demodulates, deinterleaves, and decodes each detected symbol stream to recover the traffic data for the data stream. The processing by the RX data processor 2160 is complementary to that performed by the TX MIMO processor 2120 and the TX data processor 2114 at the device 2110.

A processor 2170 periodically determines which pre-coding matrix to use (discussed below). The processor 2170 formulates a reverse link message comprising a matrix index portion and a rank value portion. A data memory 2172 may store program code, data, and other information used by the processor 2170 or other components of the device 2150.

The reverse link message may comprise various types of information regarding the communication link and/or the received data stream. The reverse link message is then processed by a TX data processor 2138, which also receives traffic data for a number of data streams from a data source 2136, modulated by a modulator 2180, conditioned by the transceivers 2154A through 2154R, and transmitted back to the device 2110.

At the device 2110, the modulated signals from the device 2150 are received by the antennas 2124, conditioned by the transceivers 2122, demodulated by a demodulator ("DEMOD") 2140, and processed by a RX data processor 2142 to extract the reverse link message transmitted by the device 2150. The processor 2130 then determines which pre-coding matrix to use for determining the beam-forming weights then processes the extracted message.

FIG. 21 also illustrates that the communication components may include one or more components that perform interference control operations as taught herein. For example, an interference ("INTER.") control component 2190 may cooperate with the processor 2130 and/or other components of the device 2110 to send/receive signals to/from another device (e.g., device 2150) as taught herein. Similarly, an interference control component 2192 may cooperate with the processor 2170 and/or other components of the device 2150 to send/receive signals to/from another device (e.g., device 2110). It should be appreciated that for each device 2110 and 2150 the functionality of two or more of the described components may be provided by a single component. For example, a single processing component may provide the functionality of the interference control component 2190 and the processor 2130 and a single processing component may provide the functionality of the interference control component 2192 and the processor 2170.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (IxRTT, 1×EV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 22:
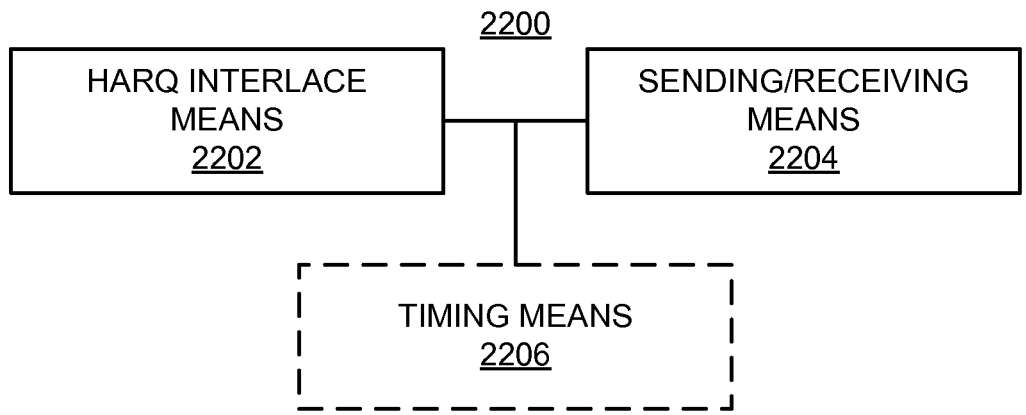
FIGS. 22-30 are simplified block diagrams of several sample aspects of apparatuses configured to manage interference as taught herein.
Figure 23:
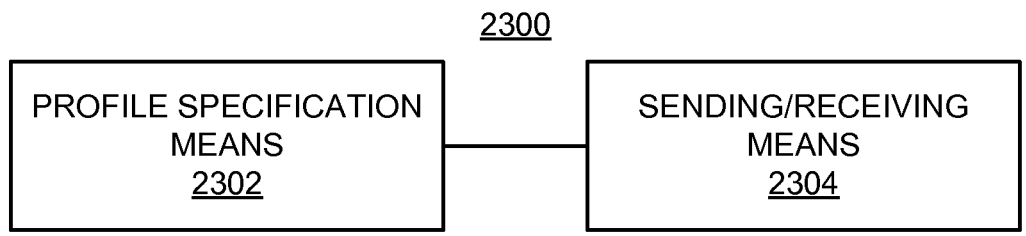
Figure 24:
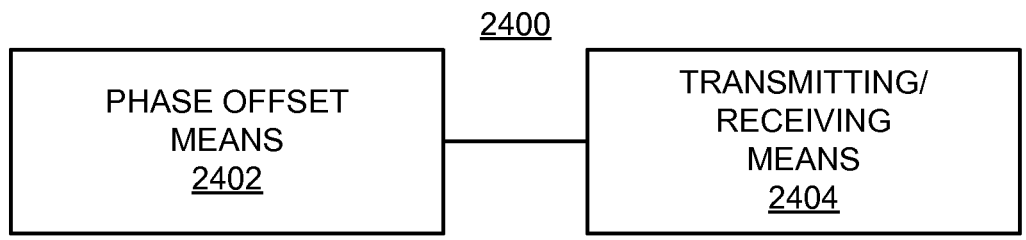
Figure 25:
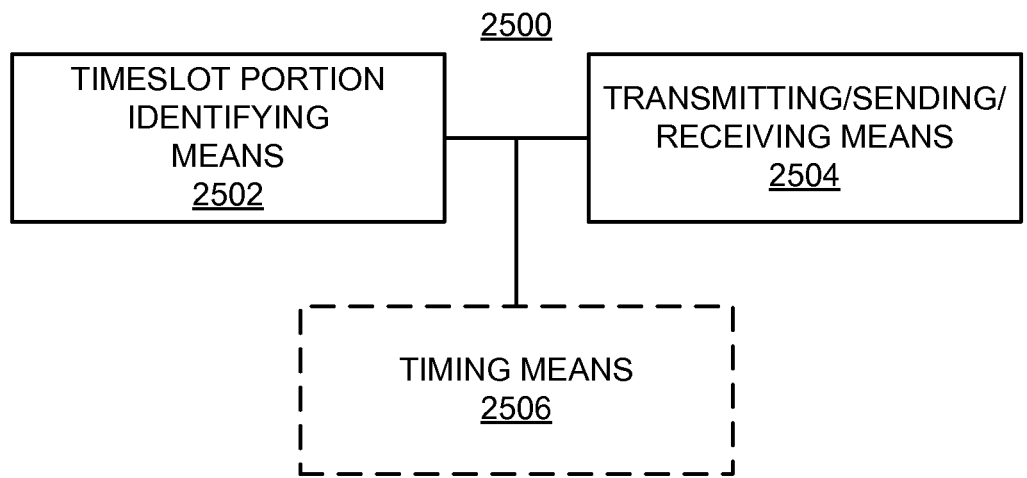
Figure 26:
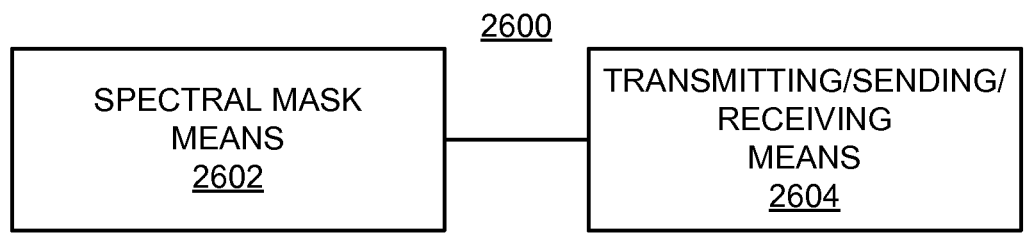
Figure 27:
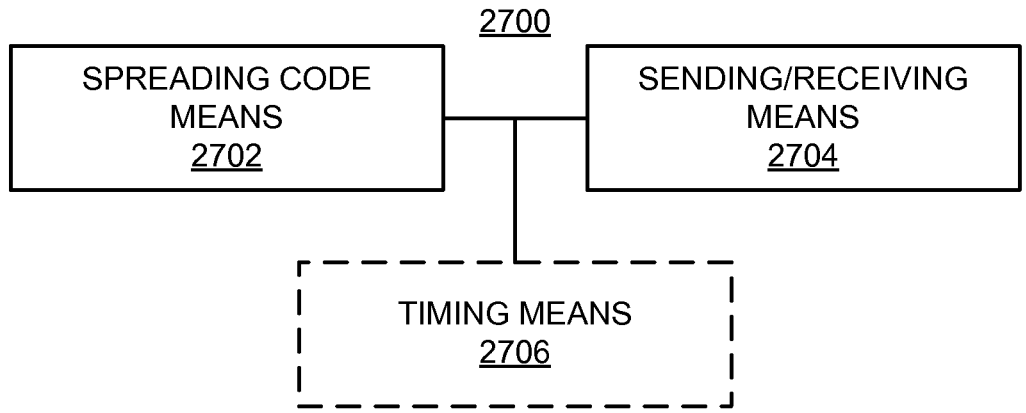
Figure 28:
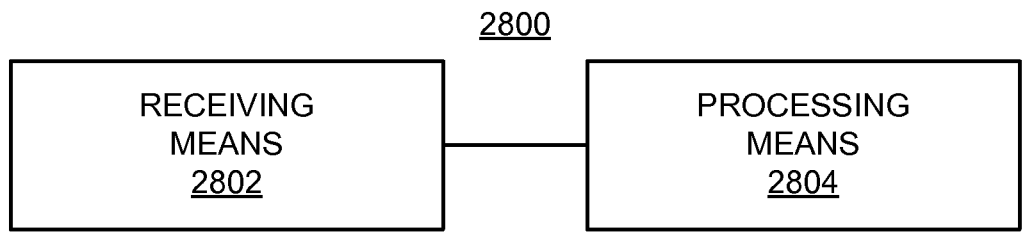
Figure 29:
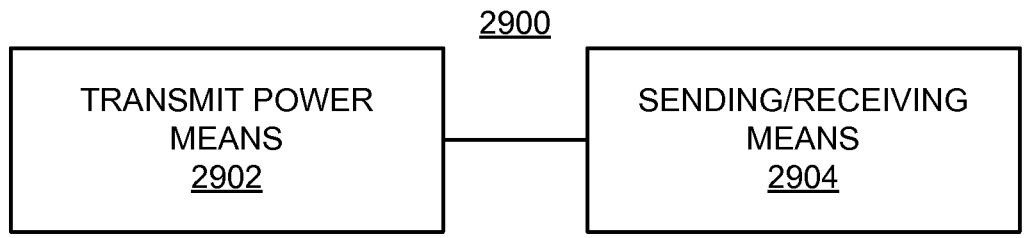
Figure 30:
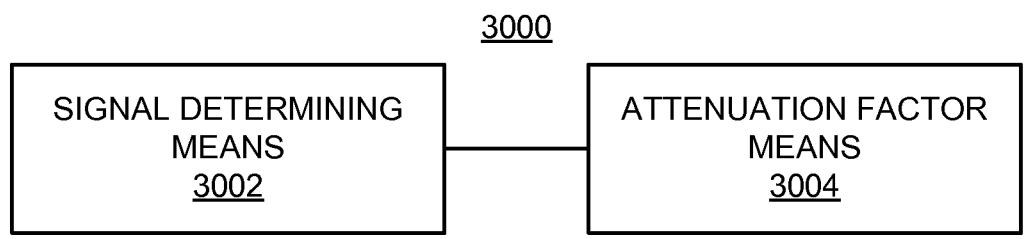

The components described herein may be implemented in a variety of ways. Referring to FIGS. 22-30, apparatuses 2200, 2300, 2400, 2500, 2600, 2700, 2800, 2900, and 3000 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 22-23 are optional.

The apparatuses 2200, 2300, 2400, 2500, 2600, 2700, 2800, 2900, and 3000 may include one or more modules that may perform one or more of the functions described above with regard to various figures. In some aspects, one or more components of the interference controller 320 or the interference controller 322 may provide functionality relating to, for example, a HARQ interlace means 2202, a profile specification means 2302, a phase offset means 2402, an identifying means 2502, a spectral mask means 2602, a spreading code means 2702, a processing means 2802, a transmit power means 2902, or an attenuation factor means 3004. In some aspects, the communication controller 326 or the communication controller 328 may provide functionality relating to, for example, means 2204, 2304, 2404, 2504, 2604, 2704, or 2904. In some aspects, the timing controller 332 or the timing controller 334 may provide functionality relating to, for example, timing means 2206, 2506, or 2706. In some aspects, the communication controller 330 may provide functionality relating to, for example, the receiving means 2802. In some aspects, the signal processor 366 may provide functionality relating to, for example, the processing means 2804. In some aspects, the transceiver 302 or the transceiver 304 may provide functionality relating to, for example, the signal determining means 3002.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of power control, comprising:
   determining a transmit power profile comprising a transmit power parameter for an access terminal associated with a first access point to mitigate interference caused by the access terminal at a second access point, wherein the transmit power profile is periodic; and
   sending the transmit power parameter to the access terminal.

2. The method of claim 1, further comprising receiving signals to estimate the interference caused by the access terminal at the second access point, wherein the transmit power parameter is determined based on the interference estimate.

3. The method of claim 1, wherein the transmit power parameter comprises maximum transmit power.

4. The method of claim 3, further comprising receiving signals indicative of the interference caused by the access terminal at the second access point, wherein the maximum transmit power is determined based on the received signals.

5. The method of claim 4, wherein the signals are received by monitoring a downlink, the method further comprising determining, based on the received signals, a received signal strength associated with signals transmitted by the second access point and/or whether the second access point transmitted a load indication.

6. The method of claim 4, wherein the signals are received from the access terminal or at least one other access terminal associated with the first access point, the method further comprising determining, based on the received signals, a received signal strength associated with signals transmitted by the second access point and/or whether the second access point transmitted a load indication.

7. The method of claim 4, wherein:
the signals are received via a backhaul from a network node or the second access point; and
the signals are indicative of interference at the second access point.

8. The method of claim 3, further comprising increasing a rise-over-thermal threshold, wherein the maximum transmit power is reduced as a result of the increase in the rise-over-thermal threshold.

9. The method of claim 3, further comprising allowing a rise-over-thermal threshold to increase without restriction.

10. The method of claim 9, further comprising limiting an increase in transmit power for the access terminal caused by the increase in the rise-over-thermal threshold.

11. The method of claim 1, wherein the transmit power parameter comprises a maximum traffic-power-to-pilot-power ratio.

12. The method of claim 11, further comprising receiving downlink signal-to-noise ratio information, wherein the maximum traffic-power-to-pilot-power ratio is determined as a function of the downlink signal-to-noise ratio information.

13. The method of claim 1, wherein the transmit power parameter is determined by the first access point.

14. The method of claim 1, wherein the transmit power parameter is determined by a network node.

15. The method of claim 1, wherein the first access point is restricted to not provide, for at least one node, at least one of signaling, data access, registration, or service.

16. An apparatus for power control, comprising:
an interference controller configured to determine a transmit power profile comprising a transmit power parameter for an access terminal associated with a first access point to mitigate interference caused by the access terminal at a second access point, wherein the transmit power profile is periodic; and
a communication controller configured to send the transmit power parameter to the access terminal.

17. The apparatus of claim 16, wherein the communication controller is further configured to receive signals to estimate the interference caused by the access terminal at the second access point, wherein the transmit power parameter is determined based on the interference estimate.

18. The apparatus of claim 16, wherein the transmit power parameter comprises maximum transmit power.

19. The apparatus of claim 18, wherein the interference controller is further configured to increase a rise-over-thermal threshold, wherein the maximum transmit power is reduced as a result of the increase in the rise-over-thermal threshold.

20. The apparatus of claim 18, wherein the interference controller is further configured to allow a rise-over-thermal threshold to increase without restriction.

21. The apparatus of claim 16, wherein the transmit power parameter comprises a maximum traffic-power-to-pilot-power ratio.

22. The apparatus of claim 21, wherein:
the communication controller is further configured to receive downlink signal-to-noise ratio information; and
the maximum traffic-power-to-pilot-power ratio is determined as a function of the downlink signal-to-noise ratio information.

23. An apparatus for power control, comprising:
means for determining a transmit power profile comprising a transmit power parameter for an access terminal associated with a first access point to mitigate interference caused by the access terminal at a second access point, wherein the transmit power profile is periodic; and
means for sending the transmit power parameter to the access terminal.

24. The apparatus of claim 23, wherein:
the means for sending is configured to receive signals to estimate the interference caused by the access terminal at the second access point; and
wherein the transmit power parameter is determined based on the interference estimate.

25. The apparatus of claim 23, wherein the transmit power parameter comprises maximum transmit power.

26. The apparatus of claim 25, wherein the means for determining is configured to increase a rise-over-thermal threshold, wherein the maximum transmit power is reduced as a result of the increase in the rise-over-thermal threshold.

27. The apparatus of claim 25, wherein the means for determining is configured to allow a rise-over-thermal threshold to increase without restriction.

28. The apparatus of claim 23, wherein the transmit power parameter comprises a maximum traffic-power-to-pilot-power ratio.

29. The apparatus of claim 28, wherein:
the means for sending is configured to receive downlink signal-to-noise ratio information; and
the maximum traffic-power-to-pilot-power ratio is determined as a function of the downlink signal-to-noise ratio information.

30. A non-transitory computer-readable medium comprising codes for causing a computer to:
determine a transmit power profile comprising a transmit power parameter for an access terminal associated with a first access point to mitigate interference caused by the access terminal at a second access point, wherein the transmit power profile is periodic; and
send the transmit power parameter to the access terminal.

31. The non-transitory computer-readable medium of claim 30, further comprising codes for causing the computer to receive signals to estimate the interference caused by the access terminal at the second access point, wherein the transmit power parameter is determined based on the interference estimate.

32. A method of power control, comprising:
determining whether received signal strength associated with signals from at least one access terminal has changed; and controlling, based on the determination, an attenuation profile comprising an attenuation factor for an access point to mitigate uplink interference, wherein the attenuation profile is periodic.

33. The method of claim 32, wherein the attenuation factor comprises a noise figure or receive attenuation.

34. The method of claim 32, wherein:
the determination comprises determining that the received signal strength is greater than or equal to a threshold; and
the controlling comprises increasing the attenuation factor.

35. The method of claim 32, wherein the at least one access terminal is not associated with the access point.

36. The method of claim 32, wherein the at least one access terminal is associated with the access point.

37. The method of claim 32, wherein the access point performs the determination.

38. The method of claim 32, wherein a network node performs the determination.

39. The method of claim 32, wherein the access point is restricted to not provide, for at least one node, at least one of signaling, data access, registration, or service.

40. An apparatus for power control, comprising:
a transceiver configured to determine whether received signal strength associated with signals from at least one access terminal has changed; and
an interference controller configured to control, based on the determination, an attenuation profile comprising an attenuation factor for an access point to mitigate uplink interference, wherein the attenuation profile is periodic.

41. The apparatus of claim 40, wherein the attenuation factor comprises a noise figure or receive attenuation.

42. The apparatus of claim 40, wherein the at least one access terminal is not associated with the access point.

43. The apparatus of claim 40, wherein the at least one access terminal is associated with the access point.

44. The apparatus of claim 40, wherein the access point performs the determination.

45. The apparatus of claim 40, wherein a network node performs the determination.

46. An apparatus for power control, comprising:
means for determining whether received signal strength associated with signals from at least one access terminal has changed; and
means for controlling, based on the determination, an attenuation profile comprising an attenuation factor for an access point to mitigate uplink interference, wherein the attenuation profile is periodic.

47. The apparatus of claim 46, wherein the attenuation factor comprises a noise figure or receive attenuation.

48. The apparatus of claim 46, wherein the at least one access terminal is not associated with the access point.

49. The apparatus of claim 46, wherein the at least one access terminal is associated with the access point.

50. The apparatus of claim 46, wherein the access point performs the determination.

51. The apparatus of claim 46, wherein a network node performs the determination.

52. A non-transitory computer-readable medium comprising codes for causing a computer to:
determine whether received signal strength associated with signals from at least one access terminal has changed; and
control, based on the determination, an attenuation profile comprising an attenuation factor for an access point to mitigate uplink interference, wherein the attenuation profile is periodic.

53. The non-transitory computer-readable medium of claim 52, wherein the attenuation factor comprises a noise figure or receive attenuation.

54. A method of power control, comprising:
receiving, by an access terminal, a transmit power profile comprising a transmit power parameter from a first access point to mitigate interference caused by the access terminal at a second access point, wherein the transmit power profile is periodic; and
transmitting, by the access terminal, in accordance with the transmit power parameter.

55. The method of claim 54, wherein the transmit power parameter comprises maximum transmit power.

56. The method of claim 54, wherein the transmit power parameter comprises a maximum traffic-power-to-pilot-power ratio.

57. An apparatus for power control, comprising:
an interference controller configured to receive, at an access terminal, a transmit power profile comprising a transmit power parameter for a first access point to mitigate interference caused by the access terminal at a second access point, wherein the transmit power profile is periodic; and
a communication controller configured to transmit, from the access terminal, in accordance with the transmit power parameter.

58. An apparatus for power control, comprising:
means for receiving, by an access terminal, a transmit power profile comprising a transmit power parameter from a first access point to mitigate interference caused by the access terminal at a second access point, wherein the transmit power profile is periodic; and
means for transmitting, by the access terminal, in accordance with the transmit power parameter.

59. A non-transitory computer-readable medium comprising codes for causing a computer to:
receive, by an access terminal, a transmit power profile comprising a transmit power parameter from a first access point to mitigate interference caused by the access terminal at a second access point, wherein the transmit power profile is periodic; and
transmit, by the access terminal, in accordance with the transmit power parameter.

* * * * *